(12) United States Patent
Hill et al.

(10) Patent No.: US 10,436,341 B1
(45) Date of Patent: Oct. 8, 2019

(54) PRESSURE RELIEF VALVES

(71) Applicant: KHOLLE Magnolia 2015, LLC, Houston, TX (US)

(72) Inventors: Larry Mitchel Hill, Cypress, TX (US); William Brent Stroebel, Houston, TX (US); Scott Taylor Donaldson, Spring, TX (US); E. Lee Colley, III, Houston, TX (US)

(73) Assignee: KHOLLE Magnolia 2015, LLC, Houston, TX (US)

( * ) Notice: Subject to any disclaimer, the term of this patent is extended or adjusted under 35 U.S.C. 154(b) by 0 days.

(21) Appl. No.: 15/789,261

(22) Filed: Oct. 20, 2017

(51) Int. Cl.
| F16K 17/00 | (2006.01) |
| F16K 17/168 | (2006.01) |
| E21B 43/26 | (2006.01) |

(52) U.S. Cl.
CPC .......... F16K 17/168 (2013.01); E21B 43/26 (2013.01)

(58) Field of Classification Search
CPC ...... F16K 17/168; F16K 17/10; F16K 17/105; F16K 17/285; F16K 17/383; F16K 17/32; E21B 43/26
USPC ..... 137/485, 487.5, 489.5, 488, 467, 115.07, 137/115.23, 115.25
See application file for complete search history.

(56) References Cited

U.S. PATENT DOCUMENTS

| 2,408,708 A | * | 10/1946 | Tweedle | ................. | G05D 16/10 |
| | | | | | 137/489.5 |
| 2,587,212 A | * | 2/1952 | Placette | ................. | F16K 17/105 |
| | | | | | 137/489.5 |
| 3,308,846 A | * | 3/1967 | Yuile | ...................... | F16K 17/105 |
| | | | | | 137/487.5 |
| 3,776,258 A | * | 12/1973 | Dockins, Jr. | ............ | E21B 21/10 |
| | | | | | 137/269 |
| 3,902,515 A | | 9/1975 | Douglas et al. | | |
| 4,390,041 A | * | 6/1983 | Reip | ...................... | F16K 17/105 |
| | | | | | 137/102 |
| 4,476,937 A | | 10/1984 | Rozniecki | | |
| 4,958,656 A | * | 9/1990 | Patel | ...................... | F16K 17/105 |
| | | | | | 137/467 |
| 5,011,116 A | * | 4/1991 | Alberts | ................ | F16K 17/0433 |
| | | | | | 137/469 |
| 5,131,427 A | * | 7/1992 | Latza | ...................... | F16K 17/10 |
| | | | | | 137/489 |
| 5,215,116 A | * | 6/1993 | Voss | ........................ | F16K 17/04 |
| | | | | | 137/494 |
| 5,583,490 A | | 12/1996 | Santos et al. | | |
| 5,806,553 A | * | 9/1998 | Sidwell | ............. | G05D 16/2013 |
| | | | | | 137/487.5 |

(Continued)

*Primary Examiner* — Minh Q Le
(74) *Attorney, Agent, or Firm* — Keith B. Willhelm

(57) ABSTRACT

Pressure relief valves may be tapped into high-pressure flow lines. The pressure relief valve is normally shut and is adapted to open at a threshold fluid pressure. It comprises a body, a passage, a valve seat, a ball, and a linear actuator. The passage is defined in the body and has a valve inlet and a valve outlet. The valve seat is in the passage. The ball is adapted to engage the valve seat to block flow through the passage. The linear actuator is mounted for linear movement in response to detection of the threshold pressure a from a normally extended position to a retracted position. In the extended position the ball engages the valve seat to close the passage, thereby shutting the valve. In the retracted position the ball can be flushed out of the valve by fluid flowing through the passage, thereby opening the valve.

35 Claims, 17 Drawing Sheets

(56) References Cited

U.S. PATENT DOCUMENTS

| | | | |
|---|---|---|---|
| 5,842,501 A * | 12/1998 | Powell | F16K 17/105 |
| | | | 137/489 |
| 6,131,599 A | 10/2000 | DeGood et al. | |
| 6,189,563 B1 * | 2/2001 | Taylor | F16K 31/1245 |
| | | | 137/487.5 |
| 6,209,561 B1 | 4/2001 | Kugelev et al. | |
| 7,143,776 B2 | 12/2006 | Sundholm | |
| 8,061,199 B2 | 11/2011 | DiRienzo, Jr. et al. | |
| 8,354,934 B2 | 1/2013 | Walker et al. | |
| 8,573,244 B2 | 11/2013 | Taylor | |
| 9,169,705 B2 | 10/2015 | Helms et al. | |
| 9,599,243 B1 * | 3/2017 | Taylor | F16K 17/14 |
| 9,915,373 B2 * | 3/2018 | Crawford | F16K 31/124 |
| 2009/0314355 A1 | 12/2009 | Szeglin | |
| 2010/0051119 A1 * | 3/2010 | Klein | F16K 15/044 |
| | | | 137/540 |
| 2011/0240301 A1 * | 10/2011 | Robison | E21B 23/006 |
| | | | 166/334.1 |
| 2013/0008519 A1 * | 1/2013 | Crawford | G05D 16/2093 |
| | | | 137/14 |
| 2014/0048255 A1 * | 2/2014 | Baca | E21B 33/068 |
| | | | 166/250.1 |
| 2014/0090725 A1 * | 4/2014 | Diaz | F16K 17/00 |
| | | | 137/489.5 |
| 2015/0107684 A1 | 4/2015 | Forkl et al. | |
| 2015/0300513 A1 | 10/2015 | Smets | |
| 2017/0241595 A1 * | 8/2017 | Herndon | F16K 17/406 |
| 2017/0285668 A1 * | 10/2017 | Moseley | E21B 43/26 |

* cited by examiner

PRESSURE RELIEF VALVES

FIELD OF THE INVENTION

The present invention relates generally to pressure relief valves, and especially to pressure relief valves for fluid transportation systems conveying fluids under high pressure as are common, for example, in the oil and gas industry.

BACKGROUND OF THE INVENTION

Hydrocarbons, such as oil and gas, may be recovered from various types of subsurface geological formations. The formations typically consist of a porous layer, such as limestone and sands, overlaid by a nonporous layer. Hydrocarbons cannot rise through the nonporous layer. Thus, the porous layer forms a reservoir, that is, a volume in which hydrocarbons accumulate. A well is drilled through the earth until the hydrocarbon bearing formation is reached. Hydrocarbons then can flow from the porous formation into the well.

In what is perhaps the most basic form of rotary drilling methods, a drill bit is attached to a series of pipe sections or "joints" referred to as a drill string. The drill string is suspended from a derrick and rotated by a motor in the derrick. A drilling fluid or "mud" is pumped down the drill string, through the bit, and into the bore of the well. This fluid serves to lubricate the bit. The drilling mud also carries cuttings from the drilling process back to the surface as it travels up the wellbore. As the drilling progresses downward, the drill string is extended by adding more joints of pipe.

When the drill bit has reached the desired depth, larger diameter pipes, or casing, are placed in the well and cemented in place to prevent the sides of the borehole from caving in. The well may be extended by drilling additional sections and installing large, but somewhat smaller pipes, or liners. The liners also are typically cemented in the bore. The liner may include valves, or it may then be perforated. In either event, openings in the liner are created through which oil can enter the cased well. Production tubing, valves, and other equipment are installed in the well so that the hydrocarbons may flow in a controlled manner from the formation, into the lined well bore, and through the production tubing up to the surface for storage or transport.

Hydrocarbons, however, are not always able to flow easily from a formation to a well. Some subsurface formations, such as sandstone, are very porous. Hydrocarbons can flow easily from the formation into a well. Other formations, however, such as shale rock, limestone, and coal beds, are only minimally porous. The formation may contain large quantities of hydrocarbons, but production through a conventional well may not be commercially practical because hydrocarbons flow though the formation and collect in the well at very low rates. The industry, therefore, relies on various techniques for improving the well and stimulating production from formations. In particular, various techniques are available for increasing production from formations which are relatively nonporous.

Perhaps the most important stimulation technique is the combination of horizontal wellbores and hydraulic fracturing. A well will be drilled vertically until it approaches a formation. It then will be diverted, and drilled in a more or less horizontal direction, so that the borehole extends along the formation instead of passing through it. More of the formation is exposed to the borehole, and the average distance hydrocarbons must flow to reach the well is decreased. Fractures then are created in the formation which will allow hydrocarbons to flow more easily from the formation.

Fracturing a formation is accomplished by pumping fluid, most commonly water, into the well at high pressure and flow rates. Proppants, such as grains of sand, ceramic or other particulates, usually are added to the fluid along with gelling agents to create a slurry. The slurry is forced into the formation at rates faster than can be accepted by the existing pores, fractures, faults, vugs, caverns, or other spaces within the formation. Pressure builds rapidly to the point where the formation fails and begins to fracture. Continued pumping of fluid into the formation will tend to cause the initial fractures to widen and extend further away from the wellbore, creating flow paths to the well. The proppant serves to prevent fractures from closing when pumping is stopped.

A formation rarely will be fractured all at once. It typically will be fractured in many different locations or zones and in many different stages. Fluids will be pumped into the well to fracture the formation in a first zone. Typically, the first zone will be at the bottom or "toe" of the well. After the initial zone is fractured, pumping is stopped, and a plug is installed or otherwise established in the liner at a point above the fractured zone. Pumping is resumed, and fluids are pumped into the well to fracture the formation in a second zone located above the plug. That process is repeated for zones further up the formation until the formation has been completely fractured.

Once the well is fractured, large quantities of water and sand that were injected into the formation eventually must be allowed to flow out of the well. The water and sand will be separated from hydrocarbons produced by the well to protect downstream equipment from damage and corrosion. The production stream also may require additional processing to neutralize corrosive agents in the stream.

Systems for successfully completing a fracturing operation, therefore, are extensive and complex, as may be appreciated from FIG. 1. FIG. 1 illustrates schematically a common, conventional frac system. Water from tanks 1 and gelling agents dispensed by a chemical unit 2 are mixed in a hydration unit 3. The discharge from hydration unit 3, along with sand carried on conveyors 4 from sand tanks 5 is fed into a blending unit 6. Blender 6 mixes the gelled water and sand into a slurry. The slurry is discharged through low-pressure hoses 7 which convey it into two or more low-pressure lines 8 in a frac manifold 9. The low-pressure lines 8 in frac manifold 9 feed the slurry to an array of pumps 10, perhaps as many as a dozen or more, through low-pressure "suction" hoses 11.

Pumps 10 take the slurry and discharge it at high pressure through individual high-pressure "discharge" lines 12 into two or more high-pressure lines or "missiles" 13 on frac manifold 9. Missiles 13 flow together, i.e., they are manifolded on frac manifold 9. Several high-pressure flow lines 14 run from the manifolded missiles 13 to a "goat head" 15. Goat head 15 delivers the slurry into a "zipper" manifold 16 (also referred to by some as a "frac manifold"). Zipper manifold 16 allows the slurry to be selectively diverted to, for example, one of two well heads 17. Once fracturing is complete, flow back from the fracturing operation discharges into a flowback manifold 18 which leads into flowback tanks 19.

Frac systems are viewed as having "low-pressure" and "high-pressure" sides or, more simply, as having low sides and high sides. The low side includes the components upstream of the inlet of pumps 10, e.g., water tanks 1, hydration unit 3, blending unit 6, and the low-pressure lines 8 of frac manifold 9, which operate under relatively low pressures. The high side includes all the components downstream of the discharge outlets of pumps 10, e.g., the high-pressure missiles 13 of frac manifold 9 and flow lines 14 running to goat head 15, which operate under relatively high pressures.

The flow lines and units making up the high-side of a frac system, such as pump discharge lines 12 and flow line 14, typically are assembled from a large number of individual components often referred to as "frac iron," "flow iron," or "ground iron." Such components include straight steel pipe, fittings for splitting, combining, or changing direction of a line, gauges and other monitoring equipment, and valves and other control devices. Flow iron components are fabricated from heavy, high tensile steel and are quite rugged. They may be rated for high-pressure service up to 20,000 psi.

Nevertheless, flowline components can suffer shortened service life or failure due to the harsh conditions to which they are exposed. Not only are fluids pumped through the system at very high pressure and flow rates, but the fluid is abrasive and corrosive. Components may suffer relatively rapid erosion. The high flow rates and pressures also create vibrations through the system and exacerbate and concentrate stress on the components. The resulting strain may create fractures in the components which can propagate and lead to failure, especially in areas weakened by erosion and corrosion.

Frac jobs also have become more extensive, both in terms of the pressures required to fracture a formation and the time required to complete all stages of an operation. Prior to horizontal drilling, a typical vertical well might require fracturing in only one, two or three zones at pressures usually well below 10,000 psi. Fracturing a horizontal well, however, may require fracturing in 20 or more zones. Horizontal wells in shale formations such as the Eagle Ford shale in South Texas typically require fracturing pressures of at least 9,000 psi and 6 to 8 hours or more of pumping. Horizontal wells in the Haynesville shale in northeast Texas and northwest Louisiana require pressures around 13,500 psi. Pumping may continue near continuously—at flow rates of 2 to 3 thousand gallons per minute (gpm)—for several days before fracturing is complete.

Any failure of flowline components on site may interrupt fracturing, potentially reducing its effectiveness and inevitably increasing the amount of time required to complete the operation. Moreover, if a component fails, large quantities of fluid can be ejected at very high pressures, causing the components to move violently and potentially injure workers. Flowline components must be certified and periodically inspected and recertified, but not all damage to or weakening of the components may be detected. Fatigue stress and microscopic fracturing is difficult to detect and can lead to catastrophic failure.

Consequently, and especially in respect to the high-side of a system, if operating pressures exceed the pressure rating of a flow line at any point, operators typically will simply scrap any component that was exposed to above-rated pressures. That can add up to significant cost. Having been designed and manufactured for such harsh operating conditions, flow iron components are quite expensive, especially components rated for high pressures. Operators, therefore, invariably incorporate valves for releasing pressure from a line before the rated pressure is exceeded.

One general approach is to use an automatically controlled valve which can be opened and shut, such as a needle, globe, or gate valve. The valve is tapped into the line, as is a transducer or other sensor capable of detecting pressure. The pressure sensor is connected to a controller which will open the valve if excess pressure is detected. Once excess pressure has bled off and rated pressures are restored, the controller will shut the valve again.

Pressure transducers are capable of measuring pressures with accuracy and precision. Thus, automatic valves can reliably open a valve when pressures in the line actually exceed rated pressures, but will not open when rated pressures are not exceeded. On the other hand, valves that can be cycled open and closed, and especially their valve seats and closures, are more susceptible to wear and damage. Thus, once opened, they may not fully set and seal, and may not effectively shut the valve again. Pressure relief valves that can cycle between the closed and open positions also can be damaged by fluid in the line when they are closed after opening in response to excess pressure.

Self-actuating valves, essentially check valves, also are employed. A valve element, such as a needle or globe element, but most commonly a ball, is exposed to pressure in a flow line, but is held against a seat by a spring or compressed gas. Such valves, however, are extremely difficult to calibrate. Thus, they frequently will actuate above or below their rated pressures. They also are subject to wear and damage which can prevent them from setting and sealing once they have been in service for a period of time. In addition, such valves typically do not open fully, that is, the valve closure often presents a significant restriction to flow through the valve seat.

Another general approach is to use valves with a sacrificial closure, most commonly a burst valve. Such valves are not opened and closed in the common sense of the words. The sacrificial closure is intended for one use only. A burst disc, for example, may be used to shut off a passage through the valve. The burst disc is designed to burst when a specified pressure is exceeded, thus opening the passage and allowing the line to bleed off fluid. Once the disc has burst, a burst valve will remain "open" until a new disc is installed.

Valves with sacrificial closures also can provide accurate and precise release of excessive pressures. The degree of control, however, depends on how reliably and consistently the burst disc or other closure fails. Burst discs in particular may be manufactured to precise specifications with very close tolerances, but are relatively expensive. Lower tolerance burst discs are significantly cheaper. If used, however, they must be rated well below a desired threshold pressure to ensure that they fail when required. Necessarily, then, they may frequently burst below rated pressures and cause unnecessary disruption of the fracturing process. Moreover, burst discs have a shelf life beyond which they will not perform to specification, and the higher the tolerance the shorter the shelf life.

The statements in this section are intended to provide background information related to the invention disclosed and claimed herein. Such information may or may not constitute prior art. It will be appreciated from the foregoing, however, that there remains a need for new and improved pressure release valves and methods for protecting high-pressure flowlines from excessive pressure. Such disadvantages and others inherent in the prior art are addressed by various aspects and embodiments of the subject invention.

SUMMARY OF THE INVENTION

The subject invention, in its various aspects and embodiments, relates generally to pressure relief valves and encompasses various embodiments and aspects, some of which are specifically described and illustrated herein. One broad embodiment of the invention provides for a pressure relief valve for high-pressure fluid transportation systems. The pressure relief valve is normally shut and is adapted to open at a threshold fluid pressure. It comprises a body, a passage, a valve seat, a ball, and a linear actuator. The passage is defined in the body and has a valve inlet and a valve outlet. The inlet is adapted for connection to a fluid conduit in the system to allow fluid flow from the conduit into the passage. The outlet is adapted to discharge fluid flowing through the passage. The valve seat is in the passage. The ball is adapted to engage the valve seat to block flow through the passage. The linear actuator is mounted for linear movement in response to detection of the threshold pressure from a normally extended position to a retracted position. In the extended position the ball engages the valve seat to close the passage, thereby shutting the valve. In the retracted position the ball can be flushed out of the valve by fluid flowing through the passage, thereby opening the valve.

Other embodiments provide such pressure relief valves where the valve seat faces the outlet, and the linear actuator energizes the ball on the valve seat in the normally extended position.

Still other embodiments provide such pressure relief valves where the valve seat is a releasable seat facing the inlet. The linear actuator engages the valve seat in the extended position to place the valve seat in a catch state. The valve seat transitions to a release state when the linear actuator moves to the retracted position. Additional embodiments provide such pressure relief valves where the valve seat is a collet, a split ring, or a deformable seat.

Additional embodiments provide such valves wherein the valve comprises an access channel communicating with the passage and adapted to allow deployment of the ball into the passage.

Other embodiments of the invention provide pressure relief valve systems for high-pressure fluid transportation systems. The valve systems comprise a novel pressure relief valve and a ball drop mechanism adapted to selectively deploy a plurality of the balls into the access channel.

In other broad aspects and embodiments the invention provides for pressure relief valves for high-pressure fluid transportation systems. The pressure relief valve is normally shut and is adapted to open at a threshold fluid pressure. The pressure relief valve comprises a body, a passage, an annular packing element, and a piston. The passage is defined in the body and has a valve inlet and a valve outlet. The inlet is adapted for connection to a fluid conduit in the system to allow fluid flow from the conduit into the passage. The outlet is adapted to discharge fluid flowing through the passage. The annular packing element is in the passage. The piston is mounted for linear movement in response to detection of the threshold pressure from a normally extended position to a retracted position. In the normally extended position the piston extends into the annular packing element to close the passage, thereby shutting the valve. In the retracted position the passage is open, thereby opening the valve.

Other embodiments provide such pressure relief valves where the passage comprises a first bore communicating with the valve inlet and a second bore intersecting the first bore and communicating with the valve outlet. The annular packing element is mounted in the first bore between the inlet and the intersection. The piston is mounted in the first bore. The piston extends across the intersection when the piston is in the extended position. The piston is clear of the intersection when the piston is in the retracted position.

Still other embodiments provide such pressure relief valves where the piston has a flow path adapted to allow fluid flow through the piston when the piston is in its the retracted position and the valve is open.

Further aspects and embodiments of the invention provide for such pressure relief valves where the linear actuator is adapted for selective energization toward the extended position. When the piston or other linear actuator is energized, it is adapted to move to the extended position. When the piston or other linear actuator is de-energized in response to detection of the threshold pressure in the conduit, it is adapted to move from the extended position to the retracted position in response to fluid entering the valve.

Additional embodiments provide such pressure relief valves where flow through the valve seat is substantially unrestricted when the piston or other linear actuator is in the retracted position. Still other embodiments provide such valves where the piston or other linear actuator comprises a pneumatic or hydraulic cylinder.

The invention in other broad aspects and embodiments provides pressure relief valve systems for high-pressure fluid transportation systems. The valve systems comprise a novel pressure relief valve and a control system for selectively energizing the piston or other linear actuator in the extended position and de-energizing it in response to detection of the threshold pressure.

Other embodiments provide such systems where the piston or other linear actuator comprises a hydraulic cylinder and the pressure relief valve is operably connected to a control system. The control system comprises a pressure detector, a release valve, and a controller. The pressure detector is adapted to measure fluid pressure in the conduit. The release valve is adapted to release pressurized hydraulic fluid from the hydraulic cylinder to de-energize the piston or other linear actuator. The controller is adapted to receive signals from the detector and to generate signals for opening the release valve in response to detection of the threshold fluid pressure in the conduit.

Still other embodiments provide such systems where the piston or other linear actuator comprises a pneumatic cylinder and the pressure relief valve is operably connected to a control system. The control system comprises a pressure detector, a vent valve, and a controller. The pressure detector is adapted to measure fluid pressure in the conduit. The vent valve is adapted to vent pressurized gas from the pneumatic cylinder to de-energize the piston or other linear actuator. The controller is adapted to receive signals from the detector and to generate signals for opening the release valve in response to detection of the threshold fluid pressure in the conduit.

Further aspects and embodiments of the invention provide flow lines for high-pressure fluid transportation systems. The flow line comprises a novel pressure relief valve. Other such flow lines comprise a shutoff valve downstream of the novel pressure relief valve.

Still other embodiments provide high-pressure fluid transportation systems. The systems comprise a novel a flow line. Other such systems are systems for fracturing a well.

The invention also provides methods for controlling flow through a fluid transportation system. The methods comprise installing a novel pressure relief valve in fluid communication with a fluid conduit in the system. The valve is opened when a threshold pressure is exceeded in the conduit, thereby relieving excess pressure in the conduit. Additional embodiments provide methods where a normally open shutoff valve downstream of the pressure relief valve is shut after the pressure relief valve has opened. The pressure relief valve is then shut, and the shutoff valve is opened.

Yet other broad embodiments of the invention provide flow lines for high-pressure fluid transportation systems. The flow line comprises a pressure relief valve and a shutoff valve. The pressure relief valve has an inlet and an outlet. The inlet is connected to a high-pressure conduit in the system. The pressure relief valve being is normally shut and is adapted to open at a threshold fluid pressure in the conduit. The pressure relief valve also is adapted for closure after it has been opened. The shutoff valve connected to the outlet of the pressure relief valve. The shutoff valve is adapted for opening and closing and allows and shuts off flow from the pressure relief valve.

Finally, still other aspects and embodiments of the invention provide apparatus and methods having various combinations of such features as will be apparent to workers in the art.

Thus, the present invention in its various aspects and embodiments comprises a combination of features and characteristics that are directed to overcoming various shortcomings of the prior art. The various features and characteristics described above, as well as other features and characteristics, will be readily apparent to those skilled in the art upon reading the following detailed description of the preferred embodiments and by reference to the appended drawings.

Since the description and drawings that follow are directed to particular embodiments, however, they shall not be understood as limiting the scope of the invention. They are included to provide a better understanding of the invention and the manner in which it may be practiced. The subject invention encompasses other embodiments consistent with the claims set forth herein.

Figure 1:
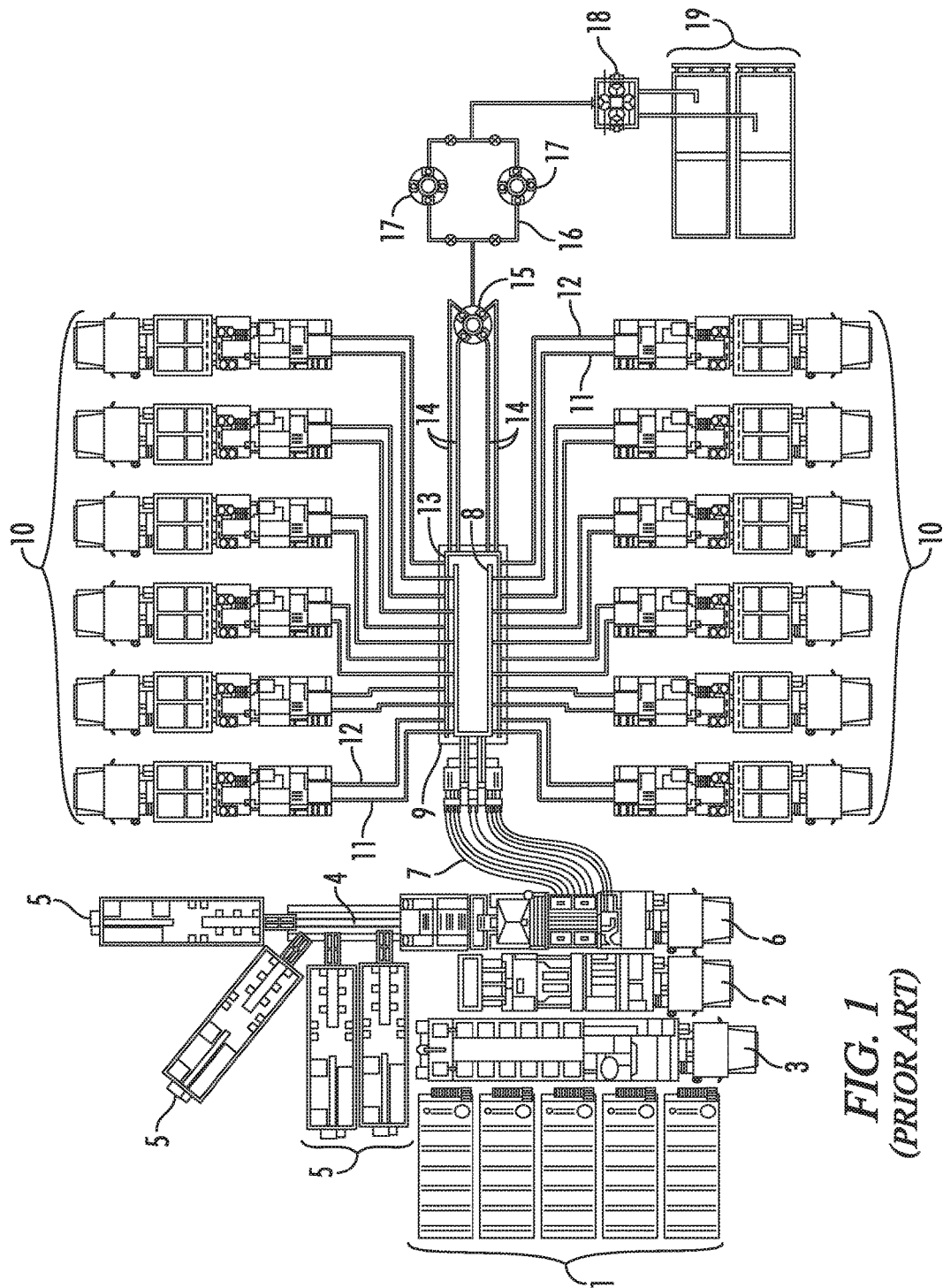
FIG. 1 (prior art) is a schematic view of a system for fracturing a well and receiving flowback from the well, which system includes various high-pressure flow lines, such as flow lines 12 and 14.

In the drawings and description that follows, like parts are identified by the same reference numerals. The drawing figures are not necessarily to scale. Certain features of the embodiments may be shown exaggerated in scale or in somewhat schematic form and some details of conventional design and construction may not be shown in the interest of clarity and conciseness.

DESCRIPTION OF ILLUSTRATIVE EMBODIMENTS

The subject invention, in various aspects and embodiments, is directed generally to pressure relief valves for flowlines, and especially for high-pressure flowlines. Specific embodiments will be described below. For the sake of conciseness, however, all features of an actual implementation may not be described or illustrated. In developing any actual implementation, as in any engineering or design project, numerous implementation-specific decisions must be made to achieve a developer's specific goals. Decisions usually will be made consistent within system-related and business-related constraints. Specific goals may vary from one implementation to another. Development efforts might be complex and time consuming and may involve many aspects of design, fabrication, and manufacture. Nevertheless, it should be appreciated that such development projects would be routine effort for those of ordinary skill having the benefit of this disclosure.

Broad embodiments of the novel valves are directed to valves which may be tapped into flow lines. They are normally shut and are adapted to open at a threshold pressure in the flow line. The valves comprise a body having a passage therein. The passage has a valve inlet and a valve outlet. The inlet is adapted for connection to a fluid conduit in the system to allow fluid flow from the conduit into the passage. The outlet is adapted to discharge fluid flowing through the passage. The valve also has a valve seat in the passage and a linear actuator. The valve seat is adapted to receive a ball such that the ball blocks flow through the passage. The linear actuator is mounted for linear movement in response to detection of the threshold pressure from a normally extended position in which the ball engages the valve seat to close the passage, thereby shutting the valve, to a retracted position in which the ball can be flushed out of the valve by fluid flowing through the passage, thereby opening the valve.

The novel pressure relief valves may be used in a variety of systems. They are particularly useful in high-pressure flow lines that are common in chemical and other industrial plants, on marine dredging vessels, strip mines, and especially in the oil and gas industry. Certain embodiments are particularly well suited as components of temporary pipe and flow line installations. Hydraulic fracturing systems, such as those shown in FIG. 1, are a very common application where pressure relief valves are a practical necessity. They may be tapped into the high-pressure side of a frac system. If operating pressures approach a specified maximum pressure, the valve can divert fluid from, and reduce pressure in the high-pressure side before the maximum pressure is exceeded.

Figure 2:
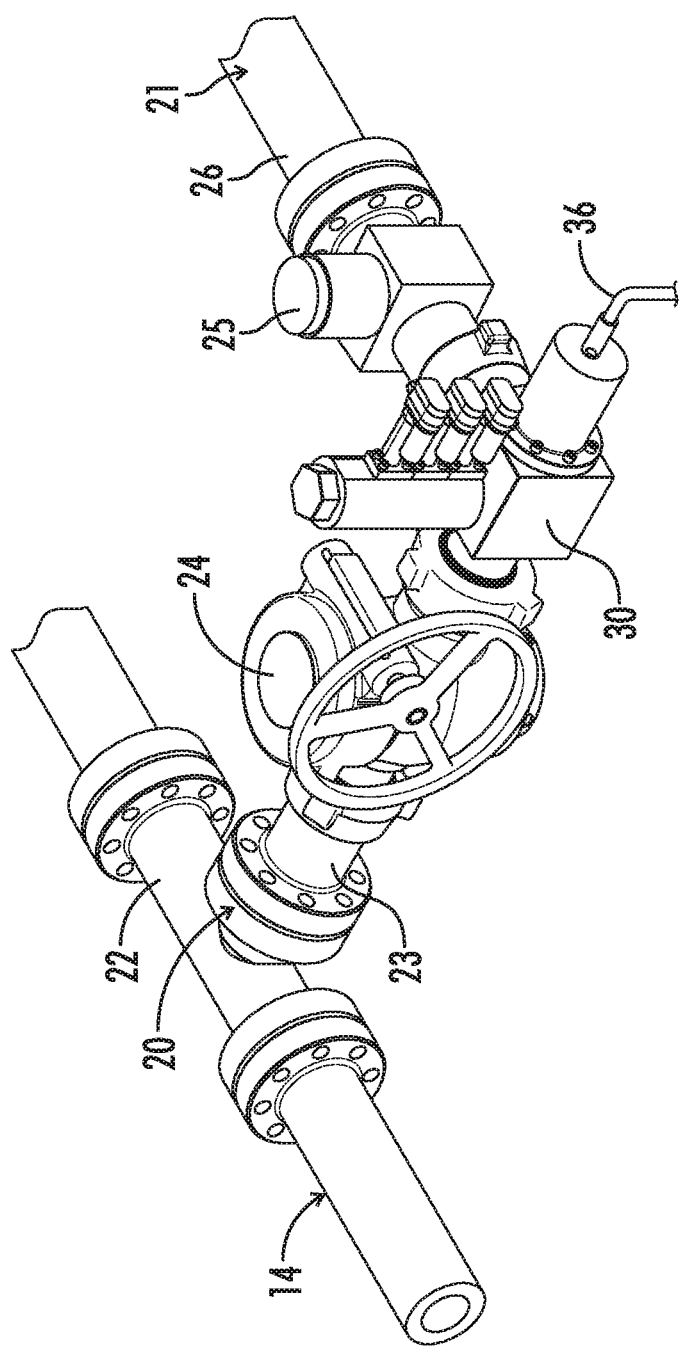
FIG. 2 is an isometric view of an installation of a first preferred embodiment 30 of the pressure relief valves of the subject invention, valve 30 being tapped into a high-pressure flow line 14 of the fracturing system shown in FIG. 1.
Figure 3:
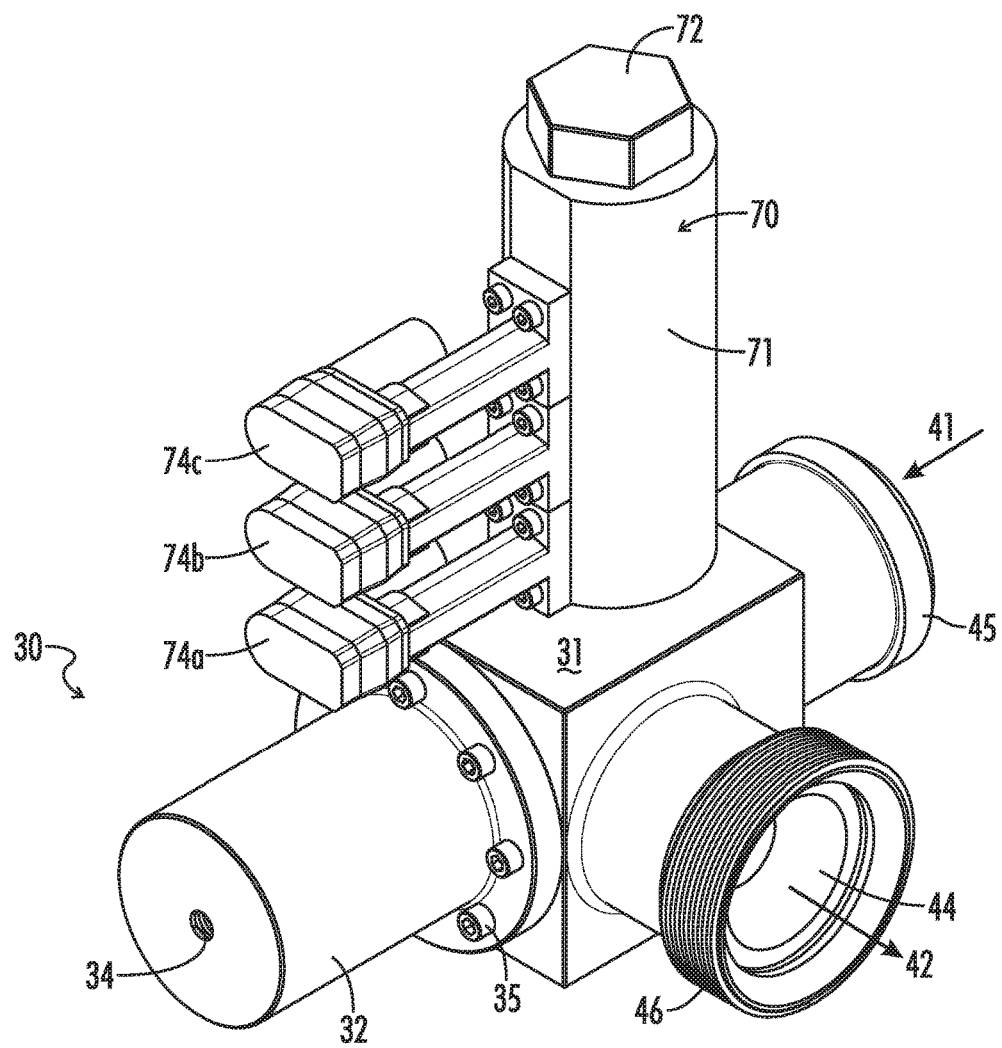
FIG. 3 is an isometric view of first preferred pressure relief valve 30 shown in FIG. 2, which pressure relief valve 30 utilizes a flushable ball 76 and a valve seat assembly 51 to shut and open valve 30.

For example, as illustrated in FIG. 2, the novel pressure relief valves, such as a first preferred embodiment 30, may be tapped into one of the high-pressure flow lines 14 which run from manifold 9 to goat head 15 in the frac system shown in FIG. 1. Valve 30 will II open if excess pressure is detected in flow line 14 allowing flow to be diverted, for example, to flowback tanks 19. Once the conditions giving rise to the excess pressure have been corrected, valve 30 may be closed to resume fracturing.

Only a small portion of flow line 14 is shown in FIG. 2. It will be appreciated, however, that flow lines such as flow line 14 are assembled from a large number of heavy steel components, most of which are not illustrated. The components may include sections of straight steel pipe, various fitting, and monitoring and control equipment. Being intended for temporary installation, those components will be joined by unions. Unions allow the components to be connected ("made up") and disconnected ("broken down") relatively quickly.

The three types of unions commonly used in frac systems are hammer (or "Weco®") unions, clamp (or "Greyloc®") unions, and flange unions. Though spoken of in terms that may imply they are discreet components, unions are actually interconnected subassemblies of the components joined by the union. A male sub will be on one component, and a mating female sub will be on the other. The subs then will be connected to each other to provide the union.

In any event, as shown in FIG. 2, pressure relief valve 30 is incorporated into a tap line 20 running from high-pressure flow line 14 to a bleed-off line 21. More particularly, flow line 14 incorporates a tee fitting 22. Tee fitting 22 is assembled into flow line 14 via flange unions. A flange-to-hammer union adaptor 23 is joined to the branch connection of tee fitting 22. Plug valve 24 is joined to adaptor 23 via a hammer union. Novel pressure relief valve 30 is joined to plug valve 24 by a hammer union as well. Pressure relief valve 30 is joined by a hammer union to a hydraulic plug valve 25. Plug valve 25 is joined by a hammer union to a hammer-to-flange adaptor 26, which in turn is joined to bleed-off line 21 by a flange union. Bleed-off line 21 typically will discharge into a tank or pit (not shown in FIG. 2) in the event fluid is diverted through tap line 20.

Plug valve 24 will be normally open when the system is operational, but may be closed to allow service or replacement of pressure relief valve 30. Plug valve 25 also will be normally open when the system is operational. It may be shut, however, after pressure relief valve 30 has been opened, to allow pressure relief valve 30 to be closed again. It will be appreciated, of course, that the novel pressure relief valves may be incorporated in different tap lines and those tap lines may incorporate a variety of components. The components of bleed-off tap line 20 also may be joined or assembled by other connections. If desired, any of the components may be assembled with flange, hammer, or clamp unions, by threaded connections, or any other conventional assembly methods.

Figure 4:
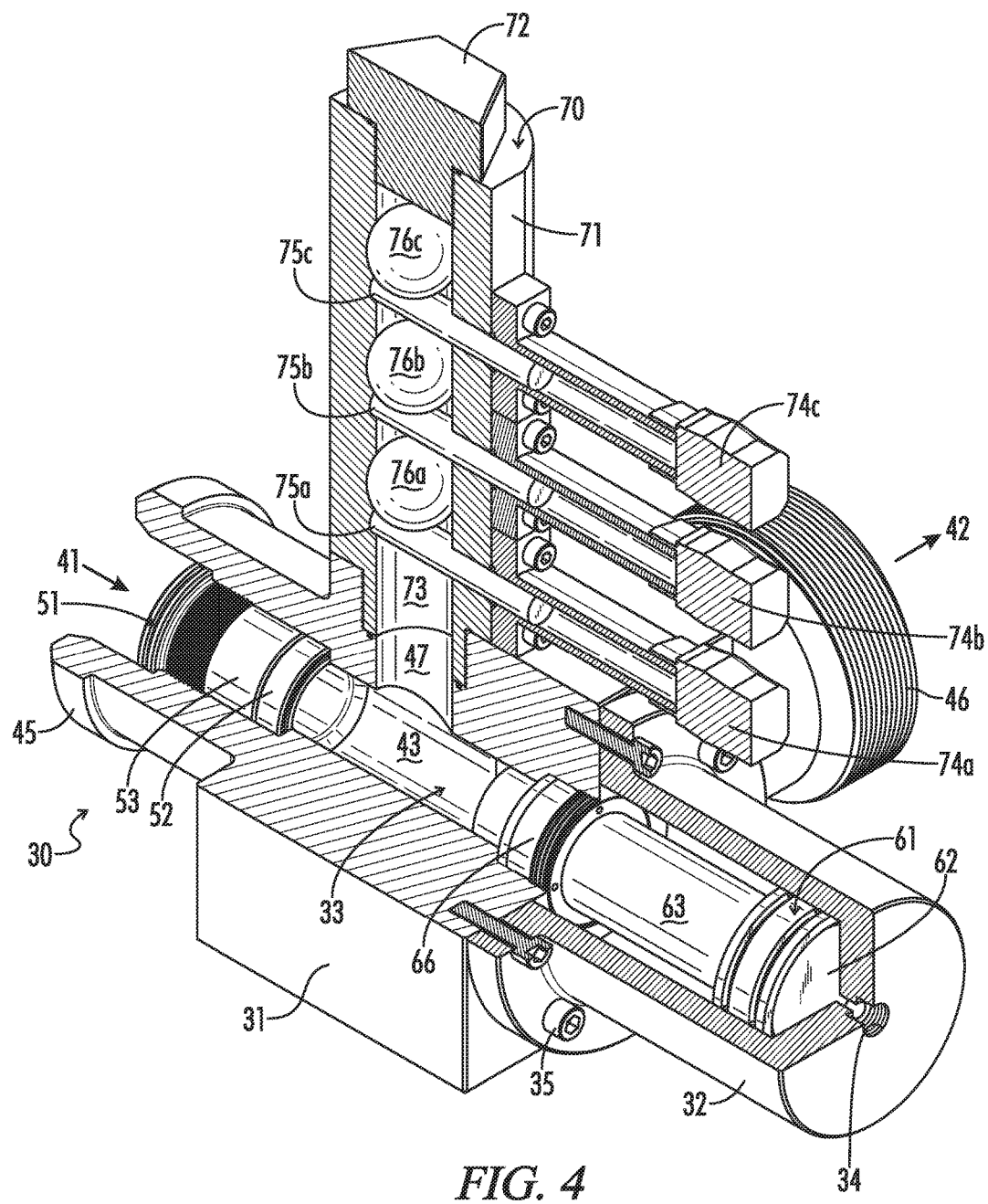
FIG. 4 is an isometric, quarter-sectional view of pressure relief valve 30 shown in FIGS. 2-3 showing pressure relief valve 30 in its "offline" "ready" position.
Figure 5:
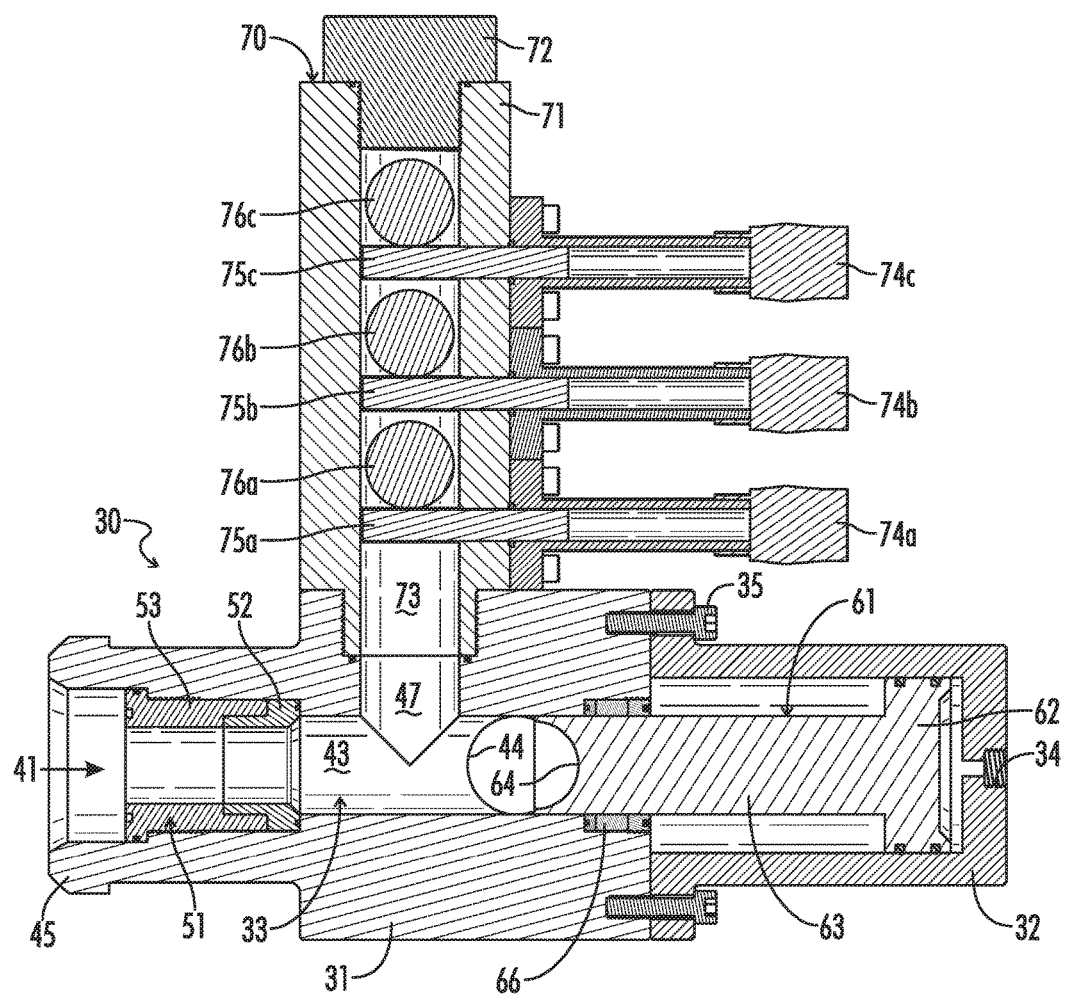
FIG. 5 is a cross-sectional view of pressure relief valve 30 shown in FIGS. 2-4 showing pressure relief valve 30 in its "offline" "ready" position.
Figure 6:
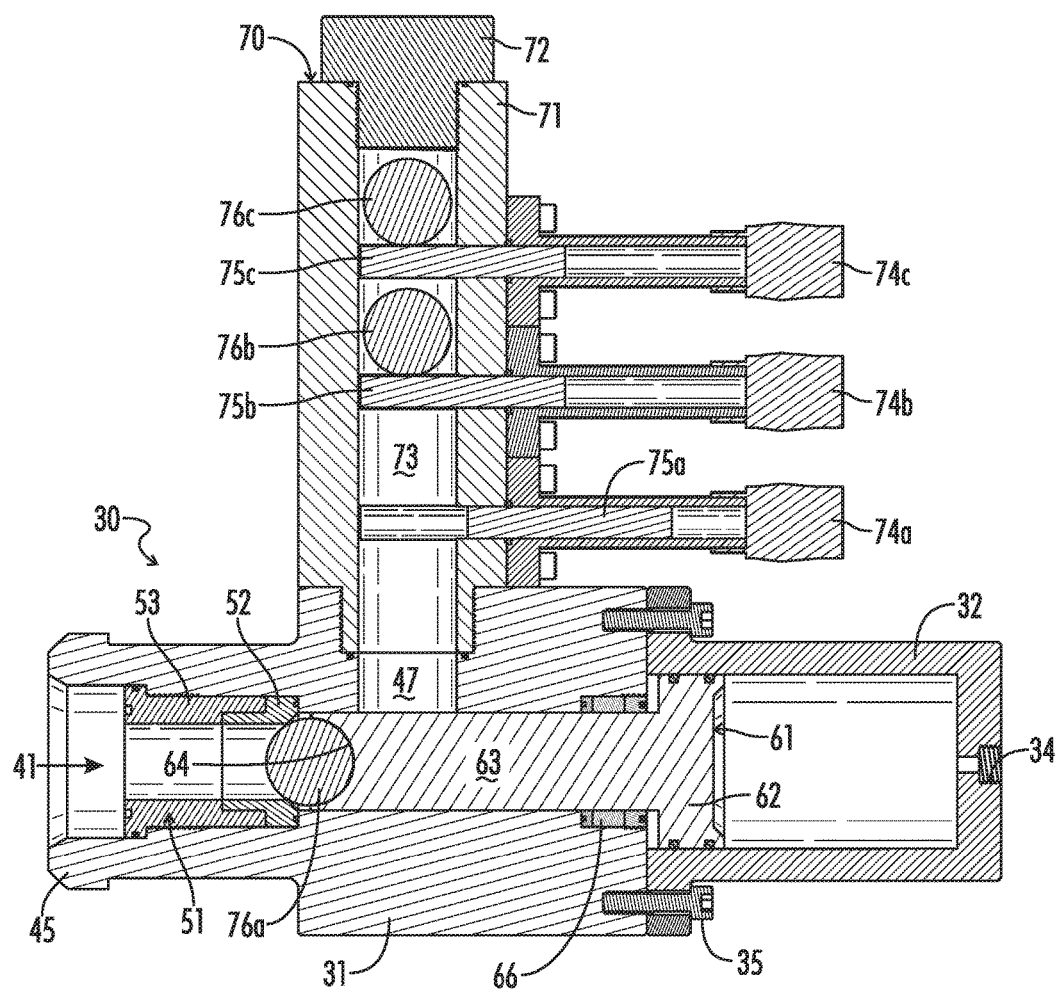
FIG. 6 is a cross-sectional view of pressure relief valve 30 shown in FIGS. 2-5 showing pressure relief valve 30 in its closed or shut position.

First preferred pressure relief valve 30 is shown in greater detail in FIGS. 3-6. Pressure relief valve 30, as described below, is designed to be shut and opened by deploying a ball 76 into valve 30 and then flushing it out of valve 30. FIGS. 4-5 show valve 30 in a ready position, i.e. the state in which it typically will be assembled into tap line 20 prior to commencing operations. FIG. 6 shows valve 30 in its normally closed position, i.e. the state in which it will be when it is online and the fluid transportation system is operating within specified pressures.

As shown therein, valve 30 generally comprises a valve body 31 and a bonnet 32. Valve body 31 and bonnet 32 provide a housing for various internal components of valve 30, namely, a seat assembly 51 and a piston 61. Piston 61, as described further below, will be energized to seat ball 76 on seat assembly 51 and then de-energized to allow ball 76 to be flushed from valve 30.

As its name implies, body 31 comprises the major portion of valve 30 and defines many of its primary features. In particular, as seen best in FIG. 4, body 31 is provided with a passage 33 extending between a valve inlet 41 and a valve outlet 42. Preferably, as shown, passage 33 is formed by an inlet bore 43 and an outlet bore 44. Outlet bore 44 intersects with inlet bore 43, generally at a right angle, within body 31 at a mid-region of inlet bore 43 somewhat removed from inlet 41. When valve 30 is opened as described further below, passage 33 thus provides a generally cylindrical, L-shaped conduit for fluids conveyed by tap line 20 into valve 30 to reduce pressure in flow line 14. Straight line bores may be easily fabricated, including areas of enlarged diameter for accommodating internal components, but valve passage 33 may have many other suitable configurations.

Inlet 41 is provided with a male hammer union sub 45 (partially shown in FIGS. 3-6). Male sub 45 facilitates assembly of valve 30 into tap line 20, e.g., by joining inlet 41 of valve 30 to the outlet of plug valve 24. Outlet 42 is provided with a female hammer union sub 46 which facilitates assembly of valve 30 into tap line 20, e.g., by joining outlet 42 of valve 30 to the inlet of shutoff valve 25.

Bonnet 32, as described further below, provides a generally cylindrical fluid chamber which, as described further below, allows piston 61 to be energized hydraulically or pneumatically. A port 34 is provided in the top of bonnet 32. Port 34 allows fluid to flow into and out of the fluid chamber. A fluid feed line 36 (shown partially in FIG. 2) will be connected to port 34, e.g., by a threaded fitting which may be screwed into port 34. Bonnet 32 preferably is removably assembled to body 31, e.g., by threaded bolts 35, to facilitate assembly and rebuilding of valve 30. Any suitable means of securing bonnet 32 to body 31, however, may be used. Seals also preferably are provided between bonnet 32 and body 31.

Seat assembly 51 is provided in inlet bore 43 between inlet 41 and the intersection with outlet bore 44. Seat assembly 51 comprises a seat insert 52 and a retainer 53. Seat insert 52 provides a valve seat, that is, a surface on which a valve closure element may bear to provide a substantially continuous seal, thereby closing passage 33 and shutting valve 30. Seat insert 52 is a generally open-cylindrical component having a valve seat, such as an annular tapered surface at its inner end which is adapted to receive ball 76. It will be noted that the valve seat on insert 52 faces valve outlet 42. That is, the valve seat faces away from the direction of flow through valve 30.

Seat insert 52 is carried within an enlarged diameter portion of inlet bore 43. The inner end of insert seat 52 abuts an annular shoulder provided within inlet bore 43. Thus, seat insert may be held securely within inlet bore 43 by retainer 53. Retainer 53 is removably coupled to body 31, for example, by threading it into passage 33. Seat insert 52 and seat retainer 53 preferably are provided with seals, such as elastomeric o-rings carried in suitable annular grooves. Thus, seat insert 52 may be replaced easily in the event the seating surface suffers unacceptable wear. At the same time, however, it will be understood that passage 33 may be provided with a seating surface of other designs. For example, a unitary seat insert may be provided. Inlet bore 43 also may simply be provided with a tapered reduction in diameter.

Preferred embodiments of the novel valves incorporate a linear actuator which is selectively energized. That is, the linear actuator preferably is energized in an extended position and then de-energized to allow fluid flowing into the valve to drive the linear actuator to a retracted position. Piston 61 in valve 30, for example, is driven alternately by hydraulic fluid injected into the upper chamber of bonnet 32 and, once that fluid is allowed to flow out of valve 30, by fluid flowing into passage 33 from high-pressure flow line 14. More specifically, as may be seen in FIGS. 4-6, piston 61 has an enlarged, generally cylindrical head 62 at one end of a piston rod 63. Head 62 of piston 61 is closely fitted for linear movement within bonnet 32 and divides the fluid chamber within bonnet 32 into an upper and a lower chamber. Suitable seals, such as elastomeric O-rings, preferably are provided to seal around head 62 of piston 61. Thus, piston 61 may be energized towards an extended position by injecting fluid, such as hydraulic fluid, into the upper chamber within bonnet 32.

Piston rod 63 extends into, and fits closely within inlet bore 43. Suitable seals, such as a packing 66, preferably are provided to seal around piston rod 63. Preferably, as exemplified, packing 66 will include conventional elastomeric and backing elements which are mounted within an enlarged diameter portion of inlet bore 43 by a threaded retainer. The inner end of the linear actuator preferably is configured to assist in seating a valve closure on the valve seat. For example, the inner end of piston 61 is cupped, that is, it has a generally hemispherically shaped, concave surface 64 into which ball 76 may fit loosely. When piston 61 is in its extended position, therefore, it will hold ball 76 securely on seat insert 52. Other configurations, however, may be used to assist in providing a seal between ball 76 and seat insert 52.

Valve 30 and other preferred embodiments are closed by seating a "flushable" ball on a seat. Thus, such embodiments preferably incorporate an access channel through which balls may be deployed into the valve. Valve 30, for example, has a ball-drop bore 47 in valve body 31. Ball-drop bore 47 leads into inlet bore 43, preferably at a point between seat insert 52 and the intersection of inlet bore 43 and outlet bore 44. When valve 30 is installed into tap line 20, ball-drop bore 47 extends vertically above the plane in which inlet bore 43 and outlet bore 44 intersect. Thus, ball-drop bore allows ball 76 to drop into position for seating on seat insert 52.

More preferably, however, embodiments relying on flushable balls will be operatively coupled to a mechanism for deploying multiple balls. For example, as shown in FIGS. 3-6, a ball-drop device 70 is assembled to valve 30. Ball-drop device 70 is adapted to deploy, in succession, a series of balls 76 into valve 30 and generally comprises a body 71, a cap 72, and three linear actuators 74. Ball-drop device 70 can accommodate three balls, but it may be adapted to deploy any suitable number of balls.

Body 71 is coupled to valve 30. For example, as shown in the figures, it may be provided with a threaded lower end, allowing body 71 to be threaded into a threaded opening in valve body 31. Alternately, it may be joined to valve 30 by a hammer union or other union. A central bore 73 within body 71 is aligned with and leads into ball-drop bore 47 in valve body 31. Cap 72 is removable, preferably by threading it into body 71, and provides access to central bore 73 for loading balls 76 into ball-drop device 70.

Linear actuators 74 are mounted on body 71 and comprise a reciprocating pin 75. Pins 75 of linear actuators 74 are electromagnetically actuated. A variety of suitable conventional designs are known and commercially available. Conventional hydraulic or pneumatic linear actuators, however, may be used if desired. In any event, in its extended position, pins 75 extend through side bores in body 71 of linear actuator 74 and into central bore 73. When extended, pins 75 can support balls 76 within central bore 73, preventing them from dropping into valve 30. When pins 75 are selectively retracted, however, balls 76 are allowed to deploy in succession into valve 30.

More specifically, when valve 30 is in its ready position as shown in FIGS. 4-5, three balls 76 may be loaded into ball-drop device 70 for deployment. Piston 61 is in its retracted position (to the right in the figures). Rod 63 of piston 61 extends into inlet bore 43—but short of the intersection with outlet bore 44 and ball-drop bore 47.

FIG. 6 shows valve 30 in its normally closed state. Linear actuator 74a has been actuated to retract its pin 75a, allowing first ball 76a to drop through central passage 73 and ball-drop bore 47 into inlet bore 43. Fluid has been introduced through port 34 into the upper chamber of bonnet 32. As fluid flows into the upper fluid chamber, piston 61 will be urged toward an extended position (to the left in the figures). In its extended position, piston 61 has pushed ball 76a onto seat insert 52, thereby closing passage 33 and shutting valve 30.

It will be noted that when valve 30 is online, inlet 41 is tapped into high-pressure flow line 14. Ball 76a and piston 61 will be exposed to fluid pressure from flow line 14. Thus, piston 61 must be energized to hold ball 76a on seat insert 52 and maintain valve 30 in its shut position. That is, the hydraulic pressure above piston 61 will be sufficient to generate a seating force on ball 76a which is greater than the force generated by fluid tending to unseat ball 76a. Preferably, it will sufficiently higher so that ball 76a is not unseated by pressure pulses of inconsequential duration.

It will be noted that head 62 of piston 61 has a much larger diameter than piston rod 63. That allows the force generated by hydraulic pressure above piston 61 to be intensified at the end 64 of piston rod 63. Piston 61 is able to effectively hold ball 76a on seat insert 52 at significantly lower pressures than the specified maximum pressure of high-pressure flow line 14. The relative size of piston head 62 and piston end 64 may be varied, therefore, especially to minimize the pressures required for operation of valve 61.

At the same time, if excess pressure is detected in flow line 14, valve 30 may be opened simply by de-energizing piston 61. That is, fluid can be allowed to flow out of the upper fluid chamber in bonnet 32, essentially eliminating any pressure above piston 61. Fluid pressure in inlet bore 43 will cause piston 61 to fully retract. As piston 61 retracts, ball 76a is unseated and will be flushed through outlet bore 44 and out of valve 30 by fluid flowing through passage 33. When fully retracted, end 64 of piston 61 is once again short of the intersection of inlet bore 43 and outlet bore 44. That allows valve 30 to fully open without significant restriction of flow through seat assembly 51 and passage 33.

Figure 7:
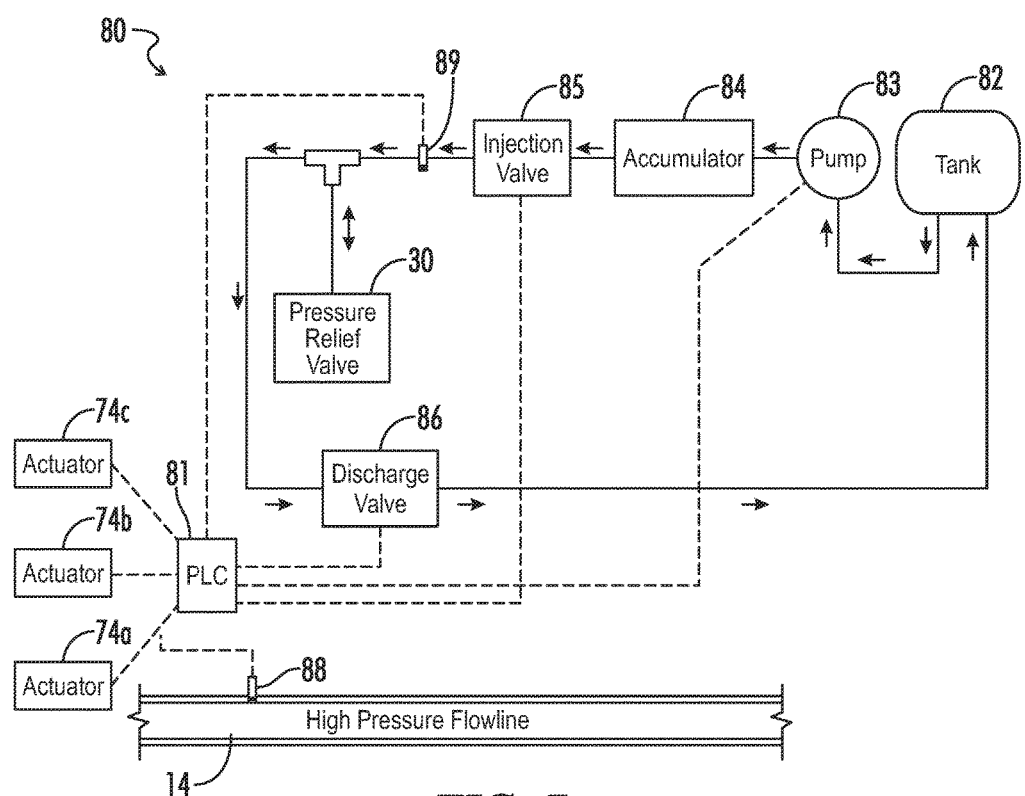
FIG. 7 is a schematic representation of a first preferred system 80 for hydraulically controlling pressure relief valve 30 and other embodiments of the novel pressure relief valves.

Actuation of piston 61 and opening of valve 30 may be described in further detail by reference to FIG. 7 which shows schematically a first preferred system 80 for controlling and operating valve 30. Control system 80 is an electronically controlled hydraulic system and generally comprises a controller 81, a hydraulic fluid tank 82, a hydraulic pump 83, an accumulator 84, an injection valve 85, a discharge valve 86, a pressure sensor 88, and a second pressure sensor 89.

Controller 81 preferably is a programmable logic controller or other programmable digital computer such as a laptop. Pump 83 is used to draw fluid from tank 82 and maintain the charge in accumulator 84. Accumulator 84 is a conventional accumulator by which a slug of hydraulic fluid may be held under a predetermined pressure for ready discharge. Most commonly it will be a gas-charged, closed accumulator in which fluid is held under pressure by compressed gas. A spring-loaded accumulator, however, also may be suitable.

Injection valve 85 and discharge valve 86 preferably are solenoid valves. They are normally shut, but are connected to and may be opened and shut by controller 81. Sensor 88 is a pressure transducer or other conventional sensor for measuring fluid pressure. It is mounted in flow line 14 and connected to controller 81. Second pressure sensor 89, like sensor 88, is a pressure transducer or other conventional sensor for measuring fluid pressure. It is mounted in the hydraulic line running from accumulator 84 to valve 30.

When valve 30 is in its ready position, as shown in FIGS. 4-5, controller 81 will actuate linear actuator 74a to allow ball 76a to drop into valve 30. Controller 81 then will open normally shut injection valve 85 allowing hydraulic fluid to flow from accumulator 84 through connecting feed lines and into valve 30. More specifically, hydraulic fluid will be delivered through port 34 into the upper fluid chamber in valve 30. Piston 61 will be energized and will move to its extended position, seating ball 76a on seat insert 52 to shut valve 30.

As valve 30 is being shut, pressure in valve 30 will be monitored, for example, by pressure sensor 89 in the line feeding valve 30. Once hydraulic pressure exceeds a predetermined value, injection valve 85 will be shut again to maintain hydraulic pressure on piston 61. That predetermined value may be referred to as the shut-off pressure or energizing pressure. As noted, because piston 61 intensifies the hydraulic pressure in the upper chamber of bonnet 32, the energizing pressure typically will be well below the specified maximum pressure of flow line 14.

When the system is operational and valve 30 is tapped into flow line 14, signals from pressure sensor 88 will be monitored by controller 81 and compared to a predetermined pressure, namely, the specified pressure for flow line 14. Typically, the specified pressure will be the pressure rating of flow line 14, but it also may be a desired maximum operating pressure for flow line 14. When pressure in excess of the specified pressure is detected, controller 81 will open normally shut discharge valve 86. That will allow fluid to flow from the upper fluid chamber in valve 30 through port 34 and ultimately back to tank 82. In turn, piston 61 will be de-energized—and rapidly so. Fluid pressure from fluid flowing into valve 30 and through passage 33 will push piston 61 back to its retracted position to open valve 30.

Once valve 30 has been opened, controller 81 typically will shut discharge valve 86. That may be done, for example, in response to detection of a pressure drop at sensor 89 in the line feeding valve 30. If desired, discharge valve 86 may be shut in response to detection of a pressure drop in flow line 14 by pressure sensor 88, or by detection of fluid pressure downstream of valve 30 by an additional pressure sensor (not shown). It also may be shut after a predetermined time lapse after valve 30 is opened In any event, once discharge valve 86 is closed, valve 30 will be open and essentially in its ready position once again. Assuming the circumstances causing the unwanted increase in pressure have been addressed, and operations otherwise are ready to be restored, valve 30 may be shut again as described above. Controller 81 will actuate linear actuator 74b to load ball 76b, and piston 61 will be re-energized to seat ball 76b on seat insert 52.

In that regard, it will be appreciated that there may be fluid may be flowing through, or entrained in and around valve 30 when it must be closed again to resume operations. That fluid may interfere with resetting valve 30 to it normally shut position. Valve 24 preferably is left open to avoid creating an incompressible column of fluid as pressure relief valve 30 is shut. On the other hand, fluid flowing through valve 30 may, for example, flush ball 76b before it can be seated on seat insert 52. Thus, valve 25 preferably will be closed prior to resetting pressure relief valve 30. It then will be opened, preferably automatically via control system 80, as soon as pressure relief valve 30 is reset. Moreover, it will be appreciated that a downstream valve, such as valve 25, may be used beneficially with other pressure relief valves. Shutting off flow downstream of such pressure relief valves also may avoid issues in resetting those valves or may avoid damage to their closure and seat elements as the valve is reset.

It will be appreciated, therefore, that the novel valves can provide significant enhancements over valves of conventional design. Like conventional automatic valves, the novel valves may be opened and shut repeatedly without taking the valve offline. For example, once ball 76a has been flushed to open valve 30, ball 76b can be deployed to close valve 30 again. The novel valves also may be adjusted on the fly to accommodate different working or rated maximum pressures. Controller 81 may be reprogrammed with a new threshold pressure, and control system 80 would open valve 30 at the new threshold pressure. No changes in valve 30 are required. Like conventional designs, the novel valves also may be actuated by highly accurate pressure detectors. They will allow the system to be run safely at pressures approaching its specified maximum pressure. Unnecessary interruptions may be minimized, while at the same time minimizing the risk of having to scrap expensive flow iron.

By using a flushable ball as a valve closure, however, the service life and reliability of the novel valves may be improved significantly. That is, in conventional valves, an effective seal typically will be established between the valve closure and valve seat by an elastomeric sealing element, a metal-to-metal seal, or a combination of the two. Elastomeric sealing elements can be extruded and in any event wear easily and rapidly, especially when exposed to highly abrasive, high-pressure fluids as are common in fracturing operations. Establishing an effective metal-to-metal seal requires a certain amount of elastic deformation, either in the valve closure or valve seat. Typically, however, a metal will wear more quickly as its ability to elastically deform increases.

In the novel valves, however, the seat may be fabricated from hard, durable metal, such as 4330, 4340, 4340V, or other 43xx series steel alloys, carburized 8620 steel, high end nickel alloys, and stainless steel, thus increasing its service life. The balls may be fabricated from softer, more easily deformed metals such as aluminum alloys and carburized steel. They also may be formed from amorphous plastic, such as Torlon® and other polyamide-imides, or from resin composites, such as convolute wound Norplex G-10. Suitable balls also may be fabricated from relatively hard, but elastically deformable elastomers, such as nitrile butadiene rubber (NBR), hydrogenated nitrile butadiene nitrile rubber (HNBR), and fluoroelastomers such as Viton®. Balls having a rigid core with an elastomer skin also may be suitable. Softer materials may not be sufficiently durable for use in conventional valves that are repeated cycled, especially if the components can be replaced only by disassembling the valve. Such limitation are largely irrelevant in the novel valves, however, and will allow a seal to be established more easily and effectively.

Moreover, in many conventional designs, once the valve closure is backed off to open the valve, it can present a restriction to flow through the valve seat. Such restrictions may not diminish the flow through a valve in any meaningful way. They can increase turbulence within the valve, however, and increased turbulence leads to increased wear. In contrast, ball 76 is used as a valve closure in valve 30. It is flushed out of valve 30 once it in is opened and does not restrict in any manner flow through valve 30. Seat assembly 51 and passage 33 are wide open are may be less susceptible to wear.

Figure 8:
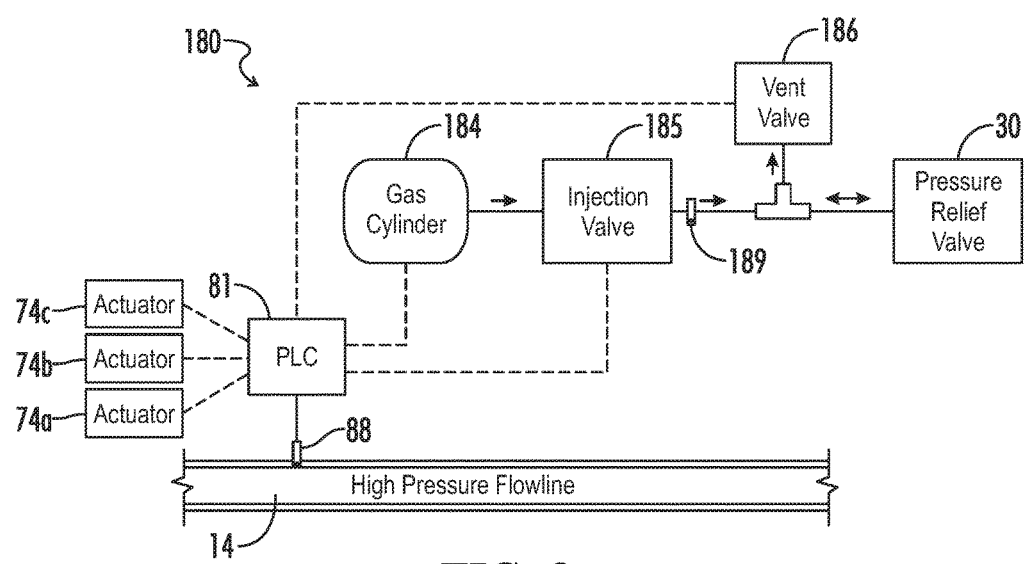
FIG. 8 is a schematic representation of a second preferred system 180 for pneumatically controlling pressure relief valve 30 and other embodiments of the novel pressure relief valves.

It will be appreciated that other systems for controlling and operating valve 30 may be used. FIG. 8, for example, shows schematically a second preferred system 180. Control system 180 is an electronically controlled pneumatic system and generally comprises controller 81, a source 184 of compressed gas, an injection valve 185, a vent valve 186, pressure sensor 88, and a second pressure sensor 189. Control system 180 operates in a manner similar to system 80 except that it relies on pneumatic power instead of hydraulic power.

Compressed gas source 184 may be a cylinder of compressed gas such as nitrogen or air. Typically, it will incorporate a regulator. Dryers and recharging pumps also may be provided, especially if air will be used as the source of compressed gas. Injection valve 185 and vent valve 186 preferably are solenoid valves. They are normally shut, but are connected to and may be opened and shut by controller 81.

When valve 30 is in its ready position, as shown in FIGS. 4-5, controller 81 will actuate linear actuator 74a to allow ball 76a to drop into valve 30. Controller 81 then will open normally shut injection valve 185 allowing compressed gas to flow from gas cylinder 84 through connecting feed lines and into valve 30. More specifically, as described above, compressed gas will be delivered through port 34 into the upper fluid chamber in valve 30. Piston 61 will be energized and will move to its extended position, seating ball 76a on seat insert 52 to shut valve 30.

As valve 30 is being shut, pressure in valve 30 will be monitored, for example, by pressure sensor 189 in the line feeding valve 30. Once pneumatic pressure exceeds a predetermined energizing pressure, injection valve 185 will be shut again to maintain pressure on piston 61.

When the system is operational and valve 30 is tapped into flow line 14, signals from pressure sensor 88 will be monitored by controller 81 and compared to the specified pressure for flow line 14. When pressure greater than the specified pressure is detected, controller 81 will open normally shut vent valve 186. That will allow gas to flow from the upper fluid chamber in valve 30 through port 34 and vent through valve 186. Piston 61 will be rapidly de-energized, and fluid pressure in valve 30 will push piston 61 back to its retracted position to open valve 30.

Once valve 30 has been opened, controller 81 typically will shut vent valve 186. That may be done, for example, in response to detection of a pressure drop at sensor 189 in the line feeding valve 30. If desired, vent valve 186 may be shut in response to detection of a pressure drop in flow line 14 by pressure sensor 88, or by detection of fluid pressure downstream of valve 30 by an additional pressure sensor (not shown). It also may be shut after a predetermined time lapse after valve 30 is opened. In any event, once vent valve 186 is closed, valve 30 will be open and essentially in its ready position. Controller 81 may actuate linear actuator 74b to load ball 76b. Piston 61 may be re-energized to shut valve 30 as described above, and operations may continue.

A second preferred pressure relief valve 130 is illustrated in FIGS. 9-12. Valve 130 is similar in respects to valve 30 in that it is opened and shut by flushable ball 76. Pressure relief valve 130 also may be incorporated into tap line 20 in the same manner as valve 30. In contrast to valve 30, however, valve 130 incorporates a releasable seat, such as a collet 151.

Figure 9:
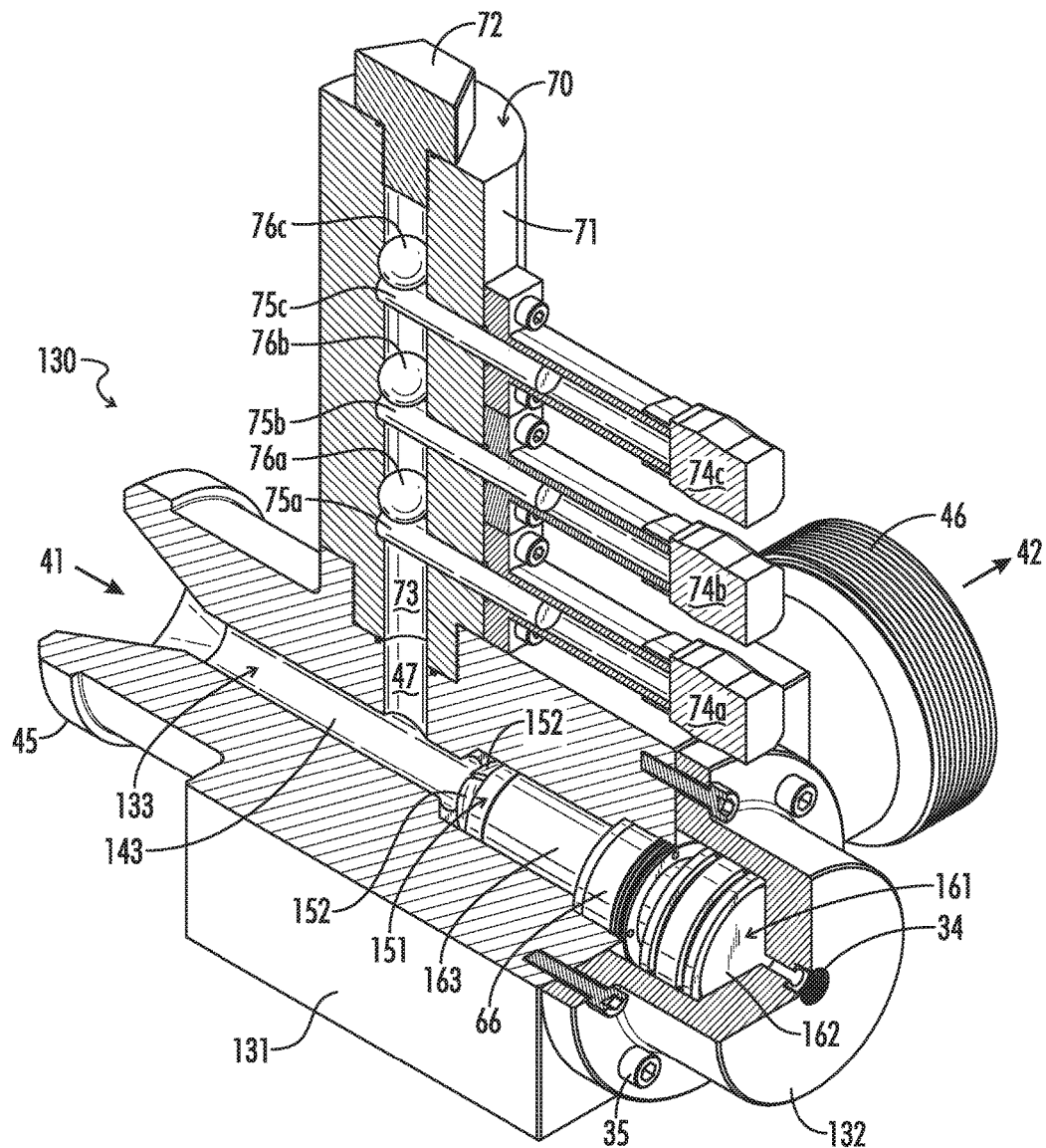
FIG. 9 is an isometric, quarter-sectional view of a second preferred embodiment 130 of the pressure relief valves of the subject invention. Pressure relief valve 130 utilizes a flushable ball 76 and a collet valve seat 151 to shut and open valve 130 and is shown in its "offline" "ready" position.
Figure 10:
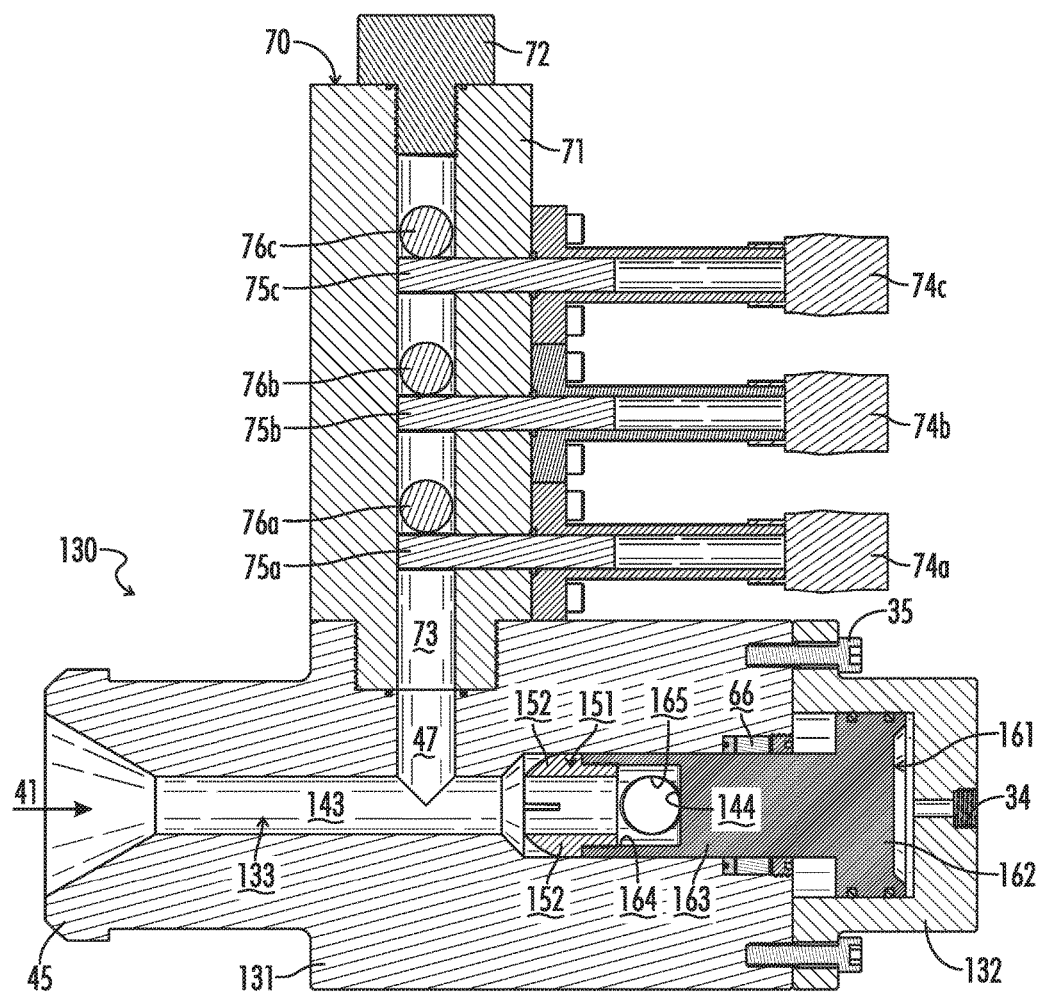
FIG. 10 is a cross-sectional view of pressure relief valve 130 shown in FIG. 9 showing pressure relief valve 130 in its "offline" "ready" position.
Figure 11:
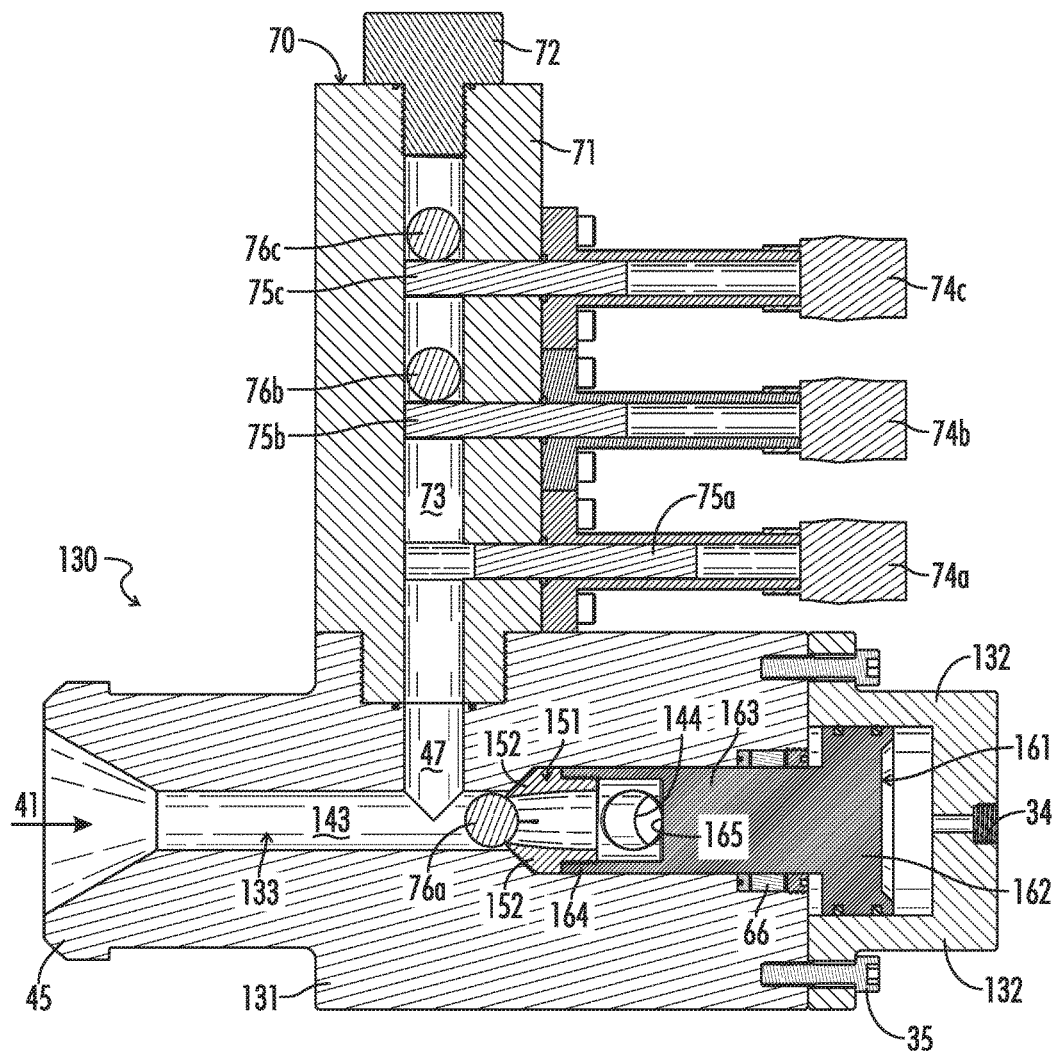
FIG. 11 is a cross-sectional view of pressure relief valve 130 shown in FIGS. 9-10 showing pressure relief valve 130 in its closed or shut position.

FIGS. 9-10 show valve 130 in its ready position, while FIG. 11 shows valve 130 in its normally closed position. As shown therein, valve 130 generally comprises a valve body 131, a bonnet 132, a collet 151, and a piston 161. Preferably, as exemplified, it is coupled to ball-drop device 70. Valve body 131 and bonnet 132 are substantially identical to valve body 31 and bonnet 32 of valve 31 except for various modifications in dimension to accommodate collet 151 and the manner in which it operates. Similarly, a passage 133 provided in body 131 is substantially similar to passage 33. Passage 133 extends between valve inlet 41 and valve outlet 42 and is formed by an inlet bore 143 which intersects with an outlet bore 144. Inlet 41 is provided with a male hammer union sub 45 (partially shown in FIGS. 9-11), and outlet 42 is provided with a female hammer union sub 46 for assembling valve 130 into tap line 20 or another portion of the fluid transportation system.

Collet 151 provides a releasable valve seat for ball 76. More particularly, collet 151 is a generally open-cylindrically shaped component having an annular base from which extend a plurality of flexible fingers 152. The annular base of collet 151 is operatively coupled to piston 161. Preferably, it is releasably coupled to piston 161 to facilitate replacement of collet 151 if it has worn unacceptably. For example, as seen best in FIG. 12, piston 161 has a generally open end 164 which is provided with internal threads. The annular base of collet 151 may be provided with external threads, allowing collet 151 to be threaded into piston 161.

Collet 151 is carried, and can slide within an expanded diameter portion of inlet bore 143 along with piston 161. The inner terminus of that enlarged portion of inlet bore 143 tapers radially inward. The ends of collet fingers 152 have mating tapered surfaces. When collet fingers 152 are compressed radially, as described further below, they form a valve seat upon which ball 76 can seat to close passage 133 and shut valve 130. When collet 151 is in its expanded state, ball 76 can pass through collet 151 and be flushed from valve 130.

Piston 161 operates in the same manner as piston 61 in valve 30. It is driven alternately by fluid injected into valve 130 and by fluid flowing into valve 130. When valve 130 is in its ready position as shown in FIGS. 9-10, piston 161 is in its retracted position. Fingers 152 of collet 151 are clear of the tapered inner terminus of the enlarged portion of inlet bore 143. In any event, they are in an open "release" state, that is, a state in which ball 76 can pass through collet 151.

FIG. 11 shows valve 130 in its normally closed state. Linear actuator 74a has been actuated to retract its pin 75a, allowing first ball 76a to drop through central passage 73 and ball-drop bore 47 into inlet bore 143. Fluid has been introduced through port 34 into the upper chamber of bonnet 132. As fluid flows into the upper fluid chamber, piston 161 will be urged toward an extended position. In its extended position, piston 161 has urged collet 151 inward. Collet fingers 152 have been ramped radially inward, compressing them into a "catch" state. That is, collet fingers 152 form a valve seat upon which ball 76a may seat, thereby closing valve 130.

It will be noted that collet fingers 152 form a valve seat which faces valve inlet 41. That is, the valve seat faces into the direction of flow through valve 130. Thus, when valve 130 is online and inlet 41 is tapped into the fluid transportation system, ball 76a and piston 161 will be exposed to fluid pressure within the system. Ball 76a will be urged against the valve seat formed by compressed collet fingers 152, but it will be necessary to energize piston 161 to maintain it in its extended position and collet 151 in its compressed state.

In the event that excess pressure is detected in the system, like valve 30, valve 130 may be opened simply by de-energizing piston 161. Fluid is allowed to flow out of the upper fluid chamber in bonnet 132. Fluid pressure in inlet bore 143 will cause piston 161 to fully retract. As piston 161 retracts, collet fingers 152 are allowed to relax and expand back into their release state. Once collet 151 is in its release state, ball 76a will be carried through collet 151 and into open end 164 of piston 161 by fluid flowing into valve 130. As seen best in FIG. 12, an opening 165 is provided in piston end 164. Opening 165 is sized to allow passage of ball 76a and, when piston 161 is retracted, is aligned with outlet bore 144, as may be seen in FIGS. 9-10. Thus, ball 76a will flow into outlet bore 144 and will be flushed from valve 130. Once ball 76a has been flushed from valve 130, passage 133 will be fully open without significant restriction of flow through collet 151 and piston 161.

Valve 130 may be controlled in a fashion similar to valve 30. Piston 161 may be extended and energized hydraulically or pneumatically, for example, by control systems 80 or 180 to place collet 151 in its compressed, catch state. If excess pressure is detected in flow line 14 by pressure sensor 88, valve 130 may be opened by de-energizing piston 161. Once piston 161 is de-energized, collet 151 will expand into its release state, allowing ball 76a to be flushed from valve 130.

It will be appreciated that a releasable valve seat may be provided by designs other than collet 151 or other collet designs. For example, a split ring may be mounted in passage 133 in a manner similar to collet 151. Piston 161 may be energized to compress the split ring and place it in a catch state, and then de-energized to allow the split ring to relax and expand into a release state. A deformable seat also may be provided. Piston 161 may be energized to block ball 76 or to back up the deformable seat. When piston 161 is de-energized, ball 76 would be allowed to push through the deformable seat. Similarly, a fixed seat may be used together with a deformable ball. Piston 161 could be energized to back up a deformable ball, and then de-energized to allow the deformable ball to squeeze through the fixed seat.

It also will be appreciated that the description references flushable "balls." Spherical balls are preferred, as they generally will be more reliably deployed from a ball-drop mechanism into the novel valves and into engagement with a valve seat. Plugs having other geometries, however, may prove suitable as flushable valve closures. The configuration of the valve seats necessarily would be coordinated with the geometry of such plugs as would any deployment mechanism. "Balls" as used herein, therefore, will be understood to include other geometries that may be used as flushable valve closures, even if such devices are not spherical.

Figure 13:
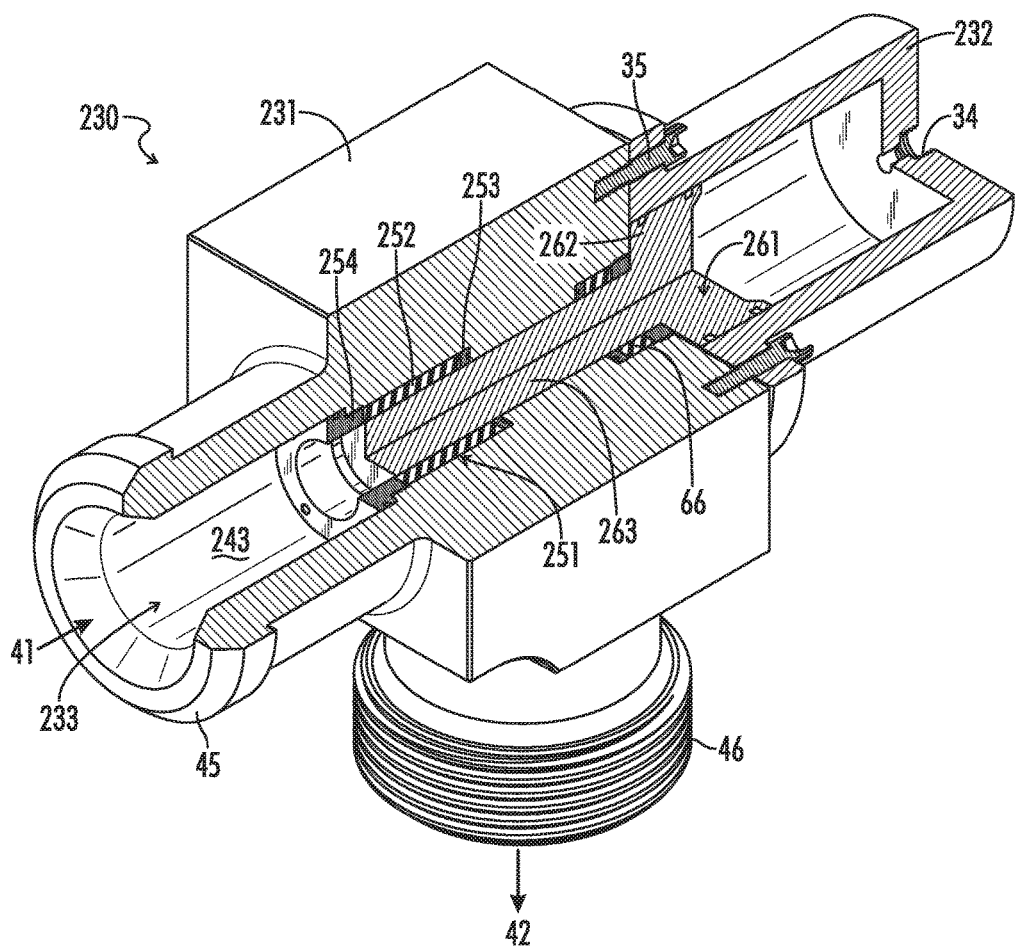
FIG. 13 is an isometric, quarter-sectional view of a third preferred embodiment 230 of the pressure relief valves of the subject invention. Pressure relief valve 230 utilizes a piston 261 and a packing assembly 251 to shut and open valve 230 and is shown in its closed or shut position.
Figure 14:
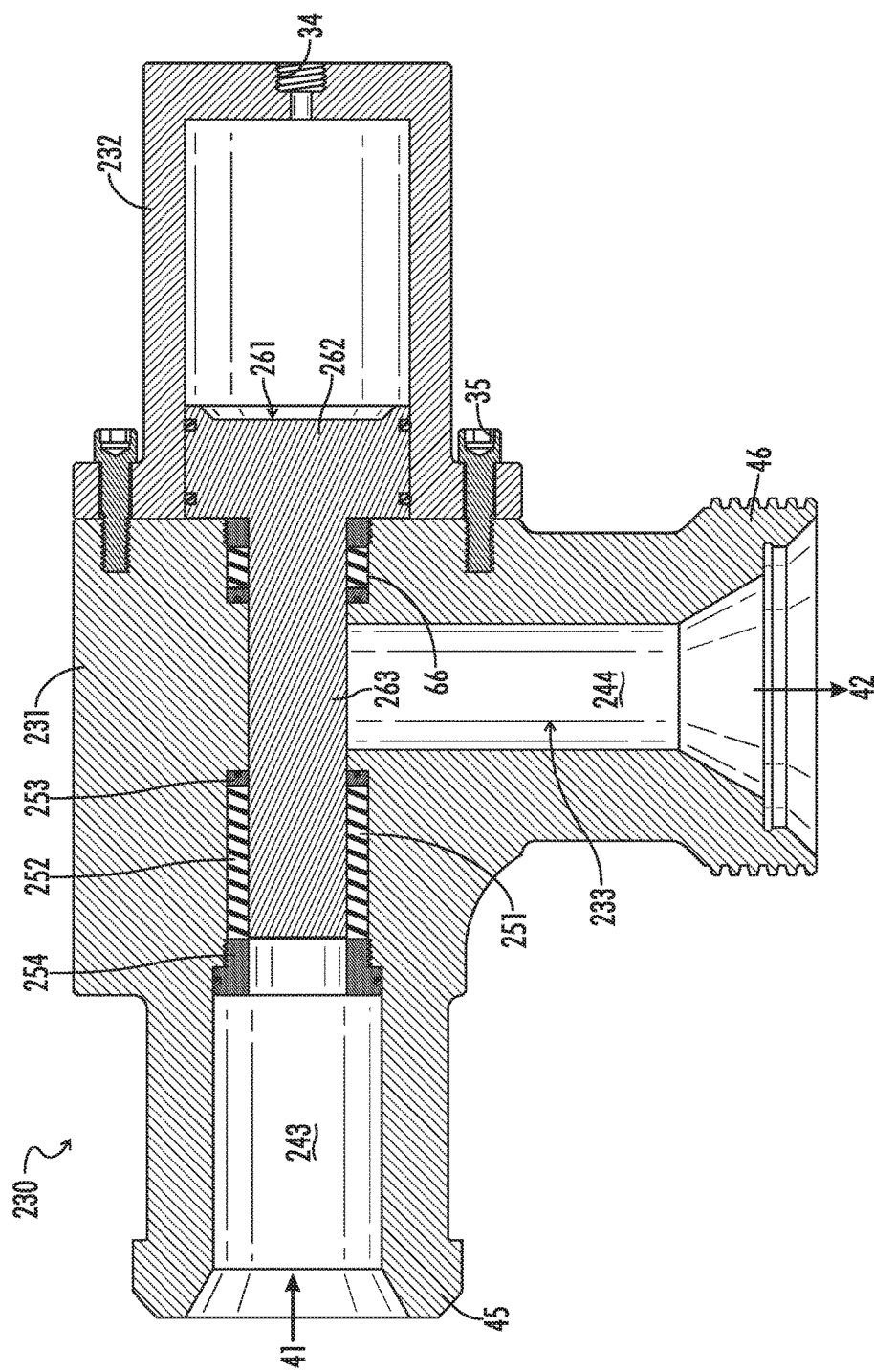
FIG. 14 is a cross-sectional view of pressure relief valve 230 shown in FIG. 13 showing valve 230 in its shut position.
Figure 15:
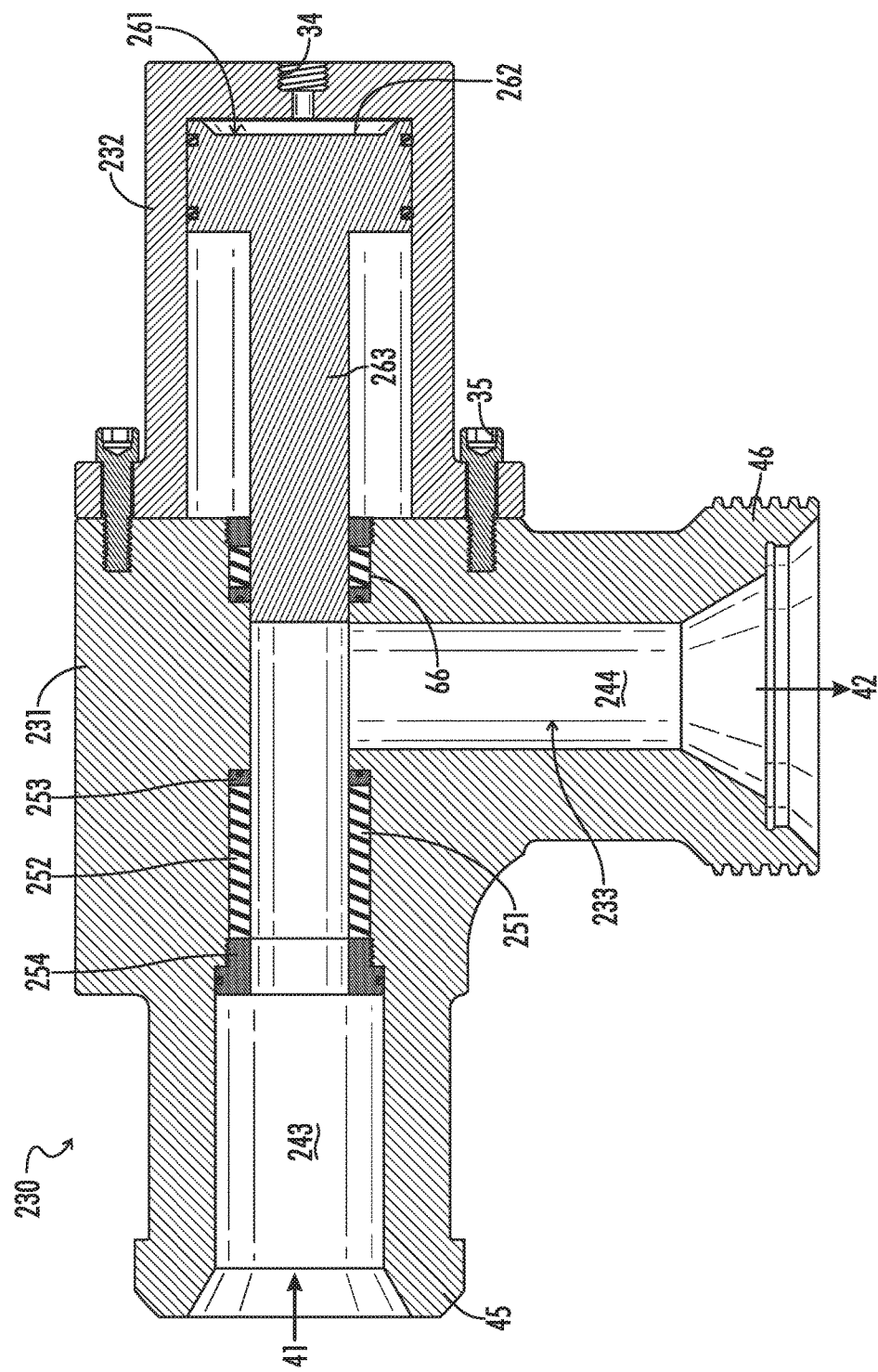
FIG. 15 is a cross-sectional view of pressure relief valve 230 shown in FIGS. 13-14 showing pressure relief valve 230 in its open position.

A third preferred pressure relief valve 230 is illustrated in FIGS. 13-15. Valve 230 is similar to valves 30 and 130 in that it incorporates a piston 261 which, like pistons 61 and 161, is driven alternately by fluid injected into valve 230 and by fluid flowing into valve 230. Pressure relief valve 230 also may be incorporated into a tap line, such as tap line 20, in the same manner as valves 30 and 130. In contrast to valves 30 and 130, however, valve 230 is not opened and shut by a flushable ball. Piston 261 itself provides a closure element.

FIGS. 13-14 show valve 230 in its normally closed position, i.e., the state in which it will be when it is online and the fluid transportation system is operating within specified pressures. FIG. 14 shows valve 230 in its open position, i.e., the state to which it transitions if excess pressure has been detected and fluid is allowed to pass through the valve. As shown therein, valve 230 generally comprises a valve body 231, a bonnet 232, a packing assembly 251, and a piston 261.

Valve body 231 and bonnet 232 are similar in certain respects to the corresponding components of valve 31 and 131 except for various modifications in dimension to accommodate packing 251. Passage 233 is similar in that it extends between valve inlet 41 and valve outlet 42 and is formed by intersecting inlet bore 243 and outlet bore 244. Inlet 41 is provided with a male hammer union sub 45 (partially shown in FIGS. 13-15), and outlet 42 is provided with a female hammer union sub 46 for assembling valve 230 into tap line 20 or other portions of the fluid transportation system. Because valve 261 does not rely on flushable balls, however, there is no ball-drop channel or ball-drop device.

Piston 261, like pistons 61 and 161, is adapted for linear movement in inlet bore from an extended position to a retracted position. When piston 261 is in its extended position, the inner end of piston rod 263 extends across outlet bore 244 and into packing assembly 251. Packing assembly 251 provides an annular seal around piston rod 263, thereby allowing piston 261 to block passage 233 and shut valve 230.

Packing assembly 251 preferably, as illustrated, comprises one or more annular elastomeric sealing elements 252 and an annular backup element 253. Elastomeric elements 252 and backup element 253 are carried within an expanded diameter portion of inlet bore 243. A threaded retainer 254 is provided to hold elements 252 and 253 in place and to allow easy replacement if they are worn. It will be appreciated, however, that there are a variety of conventional designs and materials for packing elements which may be used to provide an effective seal around reciprocating pistons in general and piston 261 in particular.

In any event, when piston 261 is extended into packing assembly 251, flow through passage 233 is shut off. Piston 261 may be extended and energized hydraulically or pneumatically, for example, by control systems 80 or 180. If excess pressure is detected in flow line 14 by pressure sensor 88, valve 230 may be opened by de-energizing piston 261. Fluid flowing into inlet bore 243 will drive piston 261 back into its retracted position. As shown in FIG. 15, when piston 261 is retracted, fluid can flow into outlet bore 244 and out of valve 230 without significant restriction.

Figure 16:
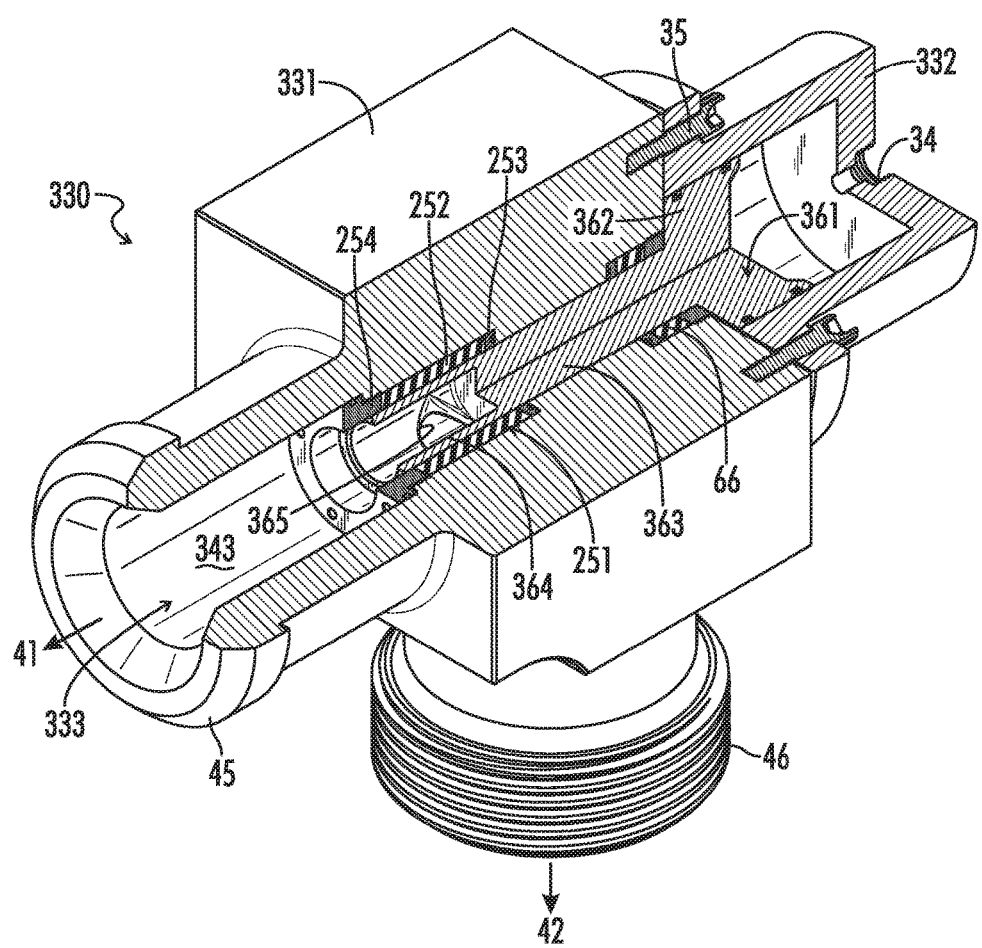
FIG. 16 is an isometric, quarter-sectional view of a fourth preferred embodiment 330 of the pressure relief valves of the subject invention. Pressure relief valve 330 is substantially identical to pressure relief valve 230 except that it incorporates a piston 361 and is shown in its shut position.
Figure 17:
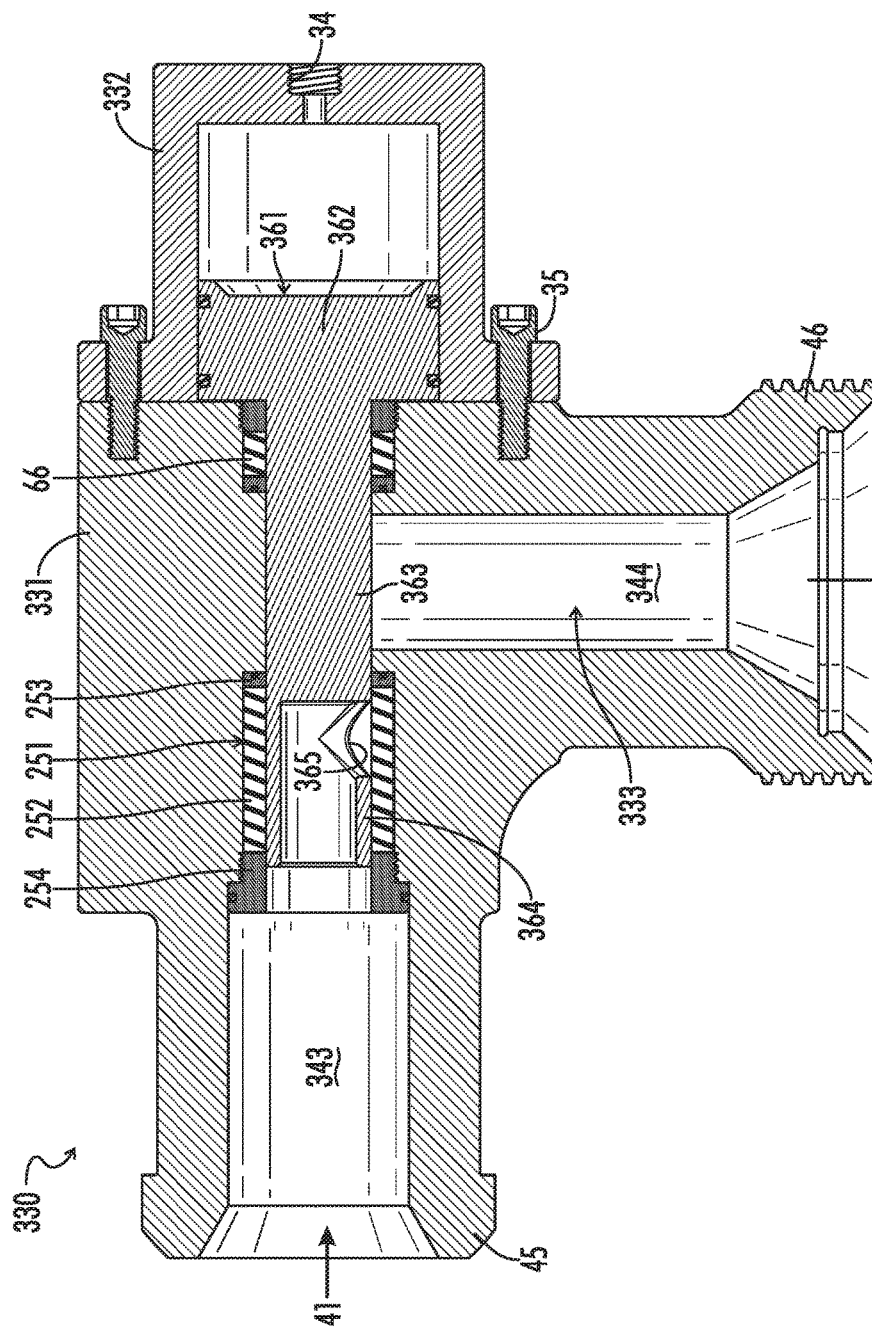
FIG. 17 is a cross-sectional view of pressure release valve 330 shown in FIG. 16 showing pressure relief valve 330 in its shut position.

A fourth preferred pressure relief valve 330 is illustrated in FIGS. 16-17 which show valve 330 in its normal, closed state. As shown therein, valve 330 generally comprises a valve body 331, a bonnet 332, packing assembly 251, and a piston 361. Valve 330 is substantially identical to valve 230 except that it incorporates piston 361.

Figure 12:
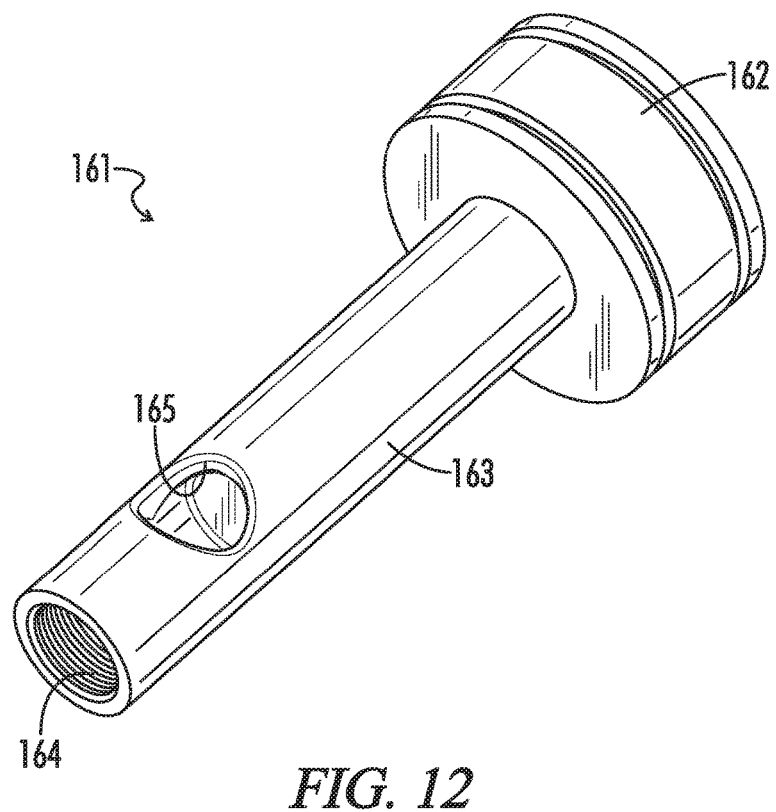
FIG. 12 is an isometric view of a piston 161 incorporated into pressure relief valve 130 shown in FIGS. 9-11.

Piston 361 is similar in design to piston 161 of valve 130 shown in FIG. 12. It is provided with an open-cylindrically shaped, inner end 364 and an opening 365. When piston 361 is in its extended position, its inner end 364 and opening 365 extend beyond outlet bore 244. Thus, piston 361 will shut off flow from inlet bore 243 into outlet bore 244. When piston 361 is retracted, however, opening 365 substantially aligns with outlet bore 344. Fluid can flow through the open end 364 of piston 361, through opening 365, and into outlet bore 344, thus opening valve 361. At the same time, however, piston end 364 will remain partially within packing assembly 251, thus reducing wear and tear that would be created if piston 361 were to repeatedly withdraw and re-enter packing 251.

In general, the various components of the novel unions may be fabricated by methods and from materials commonly used in manufacturing flowline components. Given the extreme stress and the corrosive and abrasive fluids to which flowline components are exposed, especially those designed for high-pressure flow lines, suitable materials for the major components, such as the valve body, will be hard and strong. Such components may be fabricated from 4330, 4340, 4340V, or other 43xx series steel alloys, high end nickel alloys, and stainless steel. The components may be made by any number of conventional techniques, but typically and in large part will be made by forging, extruding, or mold casting a blank part and then machining the required features into the part. Suitable o-rings and other sealing elements may be fabricated from elastomers commonly used in high-pressure flow lines, such as NBR, HNBR, and Viton and other fluoroelastomers.

The novel valves also have been illustrated as assembled from various components. For example, valve 30 is provided with bonnet 32, inter alia, to facilitate assembly and rebuilding of valve 30. Bonnet 32 may be eliminated, however, and valve body 31 may be configured to provide a pneumatic or hydraulic chamber. The features of the novel valves may be provided by more or fewer components than illustrated.

The novel valves also will incorporate various features of conventional valves and connections. For example, the exemplified valves have been described as incorporating various seals, seats, and packing elements, and having specific unions. Other conventional features, however, may be incorporated into the novel valves as will be readily appreciated by workers in the art having the benefit of this disclosure.

Similarly, the novel valves have been described in the context of frac systems. While frac systems in particular and the oil and gas industry in general rely on pressure relief valves, especially in high-pressure applications, the novel valves are not limited to such applications or industries. Likewise, they are not limited in their application to the specific, exemplified tap lines or to the exemplified pressure ratings, nor to the exemplified control systems. Suffice it to say that the novel pressure relief valves have wide applicability wherever pressure relief valves have been conventionally applied.

It also will be appreciated that the terms such as "upper," "lower," "forward," "rearward," are made primarily with reference to the orientation in which the novel valves are illustrated in the figures. The novel valves may be installed in other orientations.

While this invention has been disclosed and discussed primarily in terms of specific embodiments thereof, it is not intended to be limited thereto. Other modifications and embodiments will be apparent to the worker in the art.

What is claimed is:

1. A pressure relief valve for high-pressure fluid transportation systems, said pressure relief valve being normally shut and adapted to open at a threshold fluid pressure, said pressure relief valve comprising:
   (a) a body;
   (b) a passage in said body having a valve inlet and a valve outlet, wherein
      i) said inlet is adapted for connection to a fluid conduit in said system to allow fluid flow from said conduit into said passage, and
      ii) said outlet is adapted to discharge fluid flowing through said passage;
   (c) a valve seat in said passage;
   (d) a ball adapted to engage said valve seat to block flow through said passage; and
   (e) a linear actuator mounted for linear movement in response to detection of said threshold pressure, when said valve is installed in said system, from
      i) a normally extended position in which said ball engages said valve seat to close said passage, thereby shutting said valve, to
      ii) a retracted position in which said ball is flushed out of said valve by fluid flowing through said passage, thereby opening said valve.

2. The pressure relief valve of claim 1, wherein said valve seat faces said outlet, and said linear actuator energizes said ball on said valve seat in said normally extended position.

3. The pressure relief valve of claim 1, wherein:
   (a) said valve seat is a releasable seat facing said inlet;
   (b) said linear actuator engages said valve seat in said extended position to place said valve seat in a catch state; and
   (c) said valve seat transitions to a release state when said linear actuator moves to said retracted position.

4. The pressure relief valve of claim 3, wherein said valve seat is a collet.

5. The pressure relief valve of claim 3, wherein said valve seat is a split ring.

6. The pressure relief valve of claim 3, wherein said valve seat is deformable seat.

7. The pressure relief valve of claim 1, wherein said linear actuator is
   (a) adapted for selective energization toward said extended position,
   (b) wherein when said linear actuator is energized, said linear actuator is adapted to move to said extended position, and
   (c) wherein when said linear actuator is de-energized in response to detection of said threshold pressure in said conduit, said linear actuator is adapted to move from said extended position to said retracted position in response to fluid entering said valve.

8. A pressure relief valve system for high-pressure fluid transportation systems, said valve system comprising a pressure relief valve of claim 7 and a control system for selectively energizing said linear actuator in said extended position and de-energizing said linear actuator in response to detection of said threshold pressure.

9. The pressure relief valve system of claim 8, wherein said linear actuator comprises a hydraulic cylinder and said pressure relief valve is operably connected to a control system comprising:
(a) a pressure detector adapted to measure fluid pressure in said conduit;
(b) a valve for releasing pressurized hydraulic fluid from said hydraulic cylinder to de-energize said linear actuator; and
(c) a controller adapted to receive signals from said detector and to generate signals for opening said release valve in response to detection of said threshold fluid pressure in said conduit.

10. The pressure relief valve system of claim 8, wherein said linear actuator comprises a pneumatic cylinder and said pressure relief valve is operably connected to a control system comprising:
(a) a pressure detector adapted to measure fluid pressure in said conduit;
(b) a valve for venting pressurized gas from said pneumatic cylinder to de-energize said linear actuator; and
(c) a controller adapted to receive signals from said detector and to generate signals for opening said release valve in response to detection of said threshold fluid pressure in said conduit.

11. A flow line for a high-pressure fluid transportation system, said flow line comprising a pressure relief valve of claim 10.

12. The flow line of claim 11, wherein said flow line comprises a shutoff valve downstream of said pressure relief valve.

13. A high-pressure fluid transportation system, said system comprising a flow line of claim 11.

14. The system of claim 13, wherein said system is a system for fracturing a well.

15. The pressure relief valve of claim 1, wherein flow through said valve seat is substantially unrestricted when said linear actuator is in said retracted position.

16. The pressure relief valve of claim 1, wherein said linear actuator comprises a pneumatic or hydraulic cylinder.

17. The pressure relief valve of claim 1, wherein said valve comprises an access channel communicating with said passage and adapted to allow deployment of said ball into said passage.

18. A pressure relief valve system for high-pressure fluid transportation systems, said valve system comprising a pressure relief valve of claim 17 and a ball drop mechanism adapted to selectively deploy a plurality of said balls into said access channel.

19. A flow line for a high-pressure fluid transportation system, said flow line comprising a pressure relief valve of claim 1.

20. The flow line of claim 19, wherein said flow line comprises a shutoff valve downstream of said pressure relief valve.

21. A high-pressure fluid transportation system, said system comprising a flow line of claim 19.

22. The system of claim 21, wherein said system is a system for fracturing a well.

23. A method for controlling flow through a fluid transportation system, wherein said method comprises:
(a) installing a pressure relief valve of claim 1 in fluid communication with a fluid conduit in said system; and
(b) opening said valve when a threshold pressure is exceeded in said conduit, thereby relieving excess pressure in said conduit.

24. The method of claim 23, wherein said method comprises:
(a) shutting a normally open shutoff valve downstream of said pressure relief valve after said pressure relief valve has opened;
(b) shutting said pressure relief valve; and
(c) opening said shutoff valve.

25. A pressure relief valve adapted for installation in a system for conveying frac fluid into a well, said pressure relief valve being normally shut and adapted to open at a threshold fluid pressure, said pressure relief valve comprising, when said valve is installed in said frac system:
(a) a valve body connected to said frac system;
(b) a passage extending through said valve body comprising:
  i) an inlet adapted to allow frac fluid from said frac system to flow into said passage;
  ii) an outlet adapted to discharge frac fluid flowing through said passage;
  iii) an inlet bore formed in said valve body and communicating with said valve inlet; and
  iv) an outlet bore formed in said valve body and communicating with said valve outlet;
  v) wherein said inlet bore and said outlet bore intersect to provide, when said valve is open, a single flow path through said inlet bore directly into said outlet bore; and
(c) a piston mounted in said inlet bore for linear movement in response to detection of said threshold pressure in said frac system from
  i) a normally extended position in which said piston extends across said intersection to close said passage, thereby shutting said valve, to
  ii) a retracted position clear of said intersection in which said passage is open, thereby opening said valve and allowing frac fluid transported through said frac system to flow through said passage and out said outlet;
(e) wherein said piston is adapted for selective energization by fluid pressure toward said extended position;
(d) wherein when said piston is energized, said piston is adapted to move to said extended position; and
(f) wherein when said piston is de-energized in response to detection of said threshold pressure, said piston is adapted to move from said extended position to said retracted position in response to fluid entering said valve.

26. A method for controlling flow through a system for conveying frac fluid into a well, wherein said method comprises:
(a) installing a pressure relief valve of claim 25 in fluid communication with a fluid conduit in said frac system; and
(b) opening said valve when a threshold pressure is exceeded in said conduit, thereby relieving excess pressure in said conduit.

27. The method of claim 26, wherein said method comprises:

(a) shutting a normally open shutoff valve downstream of said pressure relief valve after said pressure relief valve has opened;
(b) shutting said pressure relief valve; and
(c) opening said shutoff valve.

28. A flow line for a high-pressure fluid transportation system for fracturing a well, said flow line comprising a pressure relief valve of claim 25.

29. A pressure relief valve adapted for installation in a system for conveying frac fluid into a well, said pressure relief valve being normally shut and adapted to open at a threshold fluid pressure, said pressure relief valve comprising, when said valve is installed in said frac system:
(a) a valve body connected to said frac system;
(b) a passage extending through said valve body and comprising:
   i) an inlet adapted to allow frac fluid from said frac system to flow into said passage, and
   ii) an outlet adapted to discharge frac fluid flowing through said passage;
   iii) an inlet bore formed in said valve body and communicating with said valve inlet; and
   iv) an outlet bore formed in said valve body and communicating with said valve outlet;
   v) wherein said inlet bore and said outlet bore intersect;
(d) a piston
   i) having an open-cylindrically shaped end providing an axial flow path to a single radial opening in said piston end; and
   ii) mounted in said inlet bore for linear movement in response to detection of said threshold pressure in said frac system from
      (1) a shut position in which said piston extends across said intersection to close said passage, thereby shutting said valve, to
      (2) an open position in which said radial opening in said piston is aligned with said outlet bore to provide a single flow path through said piston axial flow path into said outlet bore, thereby opening said valve and allowing frac fluid transported through said frac system to flow through said passage and out said outlet.

30. A flow line for a high-pressure fluid transportation system for fracturing a well, said flow line comprising a pressure relief valve of claim 29.

31. The flow line of claim 30, wherein said flow line comprises a shutoff valve downstream of said pressure relief valve.

32. A high-pressure fluid transportation system for fracturing a well, said system comprising a flow line of claim 30.

33. A method for controlling flow through a system for conveying frac fluid into a well, wherein said method comprises:
(a) installing a pressure relief valve of claim 29 in fluid communication with a fluid conduit in said frac system; and
(b) opening said valve when a threshold pressure is exceeded in said conduit, thereby relieving excess pressure in said conduit.

34. The method of claim 33, wherein said method comprises:
(a) shutting a normally open shutoff valve downstream of said pressure relief valve after said pressure relief valve has opened;
(b) shutting said pressure relief valve; and
(c) opening said shutoff valve.

35. A flow line for a system for conveying frac fluid into a well, said flow line comprising:
(a) a pressure relief valve having an inlet and an outlet, said inlet being connected to a high-pressure conduit in said system and said outlet adapted to discharge fluid from said pressure relief valve;
(b) said pressure relief valve being normally shut and adapted to open at a threshold fluid pressure in said conduit and being adapted for closure after said opening of said valve;
(c) a shutoff valve connected to said outlet downstream of said pressure relief valve;
(d) said shutoff valve adapted for opening and closing and thereby allowing and shutting off flow of said fluid discharged from said pressure relief valve.

* * * * *